(12) United States Patent
Inoue et al.

(10) Patent No.: US 10,411,312 B2
(45) Date of Patent: Sep. 10, 2019

(54) BATTERY PACK

(71) Applicant: DENSO CORPORATION, Kariya, Aichi-pref. (JP)

(72) Inventors: Yoshimitsu Inoue, Kariya (JP); Koichi Umeda, Kariya (JP); Koji Yamashita, Kariya (JP); Hiroyoshi Yamamoto, Kariya (JP); Shota Iguchi, Kariya (JP)

(73) Assignee: DENSO CORPORATION, Kariya (JP)

(*) Notice: Subject to any disclaimer, the term of this patent is extended or adjusted under 35 U.S.C. 154(b) by 564 days.

(21) Appl. No.: 14/977,788

(22) Filed: Dec. 22, 2015

(65) Prior Publication Data

US 2016/0181675 A1 Jun. 23, 2016

(30) Foreign Application Priority Data

Dec. 22, 2014 (JP) ................................. 2014-259018
Aug. 7, 2015 (JP) ................................. 2015-157256

(51) Int. Cl.
*H01M 10/6551* (2014.01)
*H01M 10/625* (2014.01)
(Continued)

(52) U.S. Cl.
CPC ......... *H01M 10/6551* (2015.04); *B60L 50/64* (2019.02); *B60L 58/26* (2019.02); *H01M 2/1072* (2013.01); *H01M 10/625* (2015.04); *H01M 10/6563* (2015.04); *B60L 2240/545* (2013.01); *H01M 10/655* (2015.04); *H01M 10/6564* (2015.04); *H01M 10/6565* (2015.04); *H01M 10/6566* (2015.04); *H01M 2220/20* (2013.01); *Y02T 10/705* (2013.01); *Y02T 10/7005* (2013.01)

(58) Field of Classification Search
CPC .......... H01M 10/655; H01M 10/6551; H01M 10/6563; H01M 10/6564; H01M 10/6565; H01M 10/6566; H01M 2220/20; B60L 11/1874
See application file for complete search history.

(56) References Cited

U.S. PATENT DOCUMENTS

2008/0121380 A1* 5/2008 Shimoyama .............. F28F 1/12
165/121
2014/0356660 A1 12/2014 Inoue

FOREIGN PATENT DOCUMENTS

JP 2009-170370 A 7/2009
JP 2009170370 * 7/2009
(Continued)

*Primary Examiner* — Ula C Ruddock
*Assistant Examiner* — Matthew W Van Oudenaren
(74) *Attorney, Agent, or Firm* — Oliff PLC

(57) ABSTRACT

A first fin is formed on a first inside wall surface to protrude therefrom. The first fin exchanges heat between fluid and the first inside wall surface. A first fluid passage is divided between a first region that is a space where the first fin is arranged, and a second region that is a space where the first fin is not arranged. Fluid flows from the second region into the first region. The first fin includes an inflow port through which fluid flows into the first region, and an outflow port through which fluid flows out of the first region. The first fin is formed to extend from the inflow port to the outflow port. An area of the inflow port is larger than a cross-sectional area of the first fluid passage when viewed in a flow direction of fluid.

10 Claims, 16 Drawing Sheets

(51) Int. Cl.
*H01M 10/6563* (2014.01)
*H01M 2/10* (2006.01)
*B60L 58/26* (2019.01)
*B60L 50/64* (2019.01)
*H01M 10/6566* (2014.01)
*H01M 10/6564* (2014.01)
*H01M 10/655* (2014.01)
*H01M 10/6565* (2014.01)

(56) References Cited

FOREIGN PATENT DOCUMENTS

| | | |
|---|---|---|
| JP | 2009-211829 A | 9/2009 |
| JP | 2011-187275 A | 9/2011 |
| JP | 2015-046321 A | 3/2015 |

\* cited by examiner

BATTERY PACK

CROSS REFERENCE TO RELATED APPLICATIONS

This application is based on Japanese Patent Application No. 2014-259018 filed on Dec. 22, 2014 and Japanese Patent Application No. 2015-157256 filed on Aug. 7, 2015, the disclosures of which are incorporated herein by reference.

TECHNICAL FIELD

The present disclosure relates to a battery pack that has a plurality of battery cells housed in a case.

BACKGROUND

As a battery pack that has a battery cell has been known a battery pack described in, for example, JP 2009-211829A. The battery pack described in JP 2009-211829A circulates fluid in a housing in which a plurality of battery cells are housed to thereby deprive the plurality of battery cells of heat, thereby being capable of cooling the heated battery cells.

In the battery pack described in JP 2009-211829A, the fluid once circulated deprives the battery cells of heat in a process in which the fluid is again circulated, so that the fluid having once received the heat from the battery cells needs to radiate the heat to an inside wall surface of the housing. For example, like a comparative example shown in FIG. 10, by forming fins 10 in the whole region of a fluid passage in parallel to a flow direction of the fluid, a heat radiation area between the fluid flowing along the inside wall surface and the inside wall surface can be increased. Hereinafter, a construction shown in FIG. 10 is referred to as "a comparative example". Here, a heat radiation amount to the inside wall surface from the fluid is proportional not only to the heat radiation area but also to a temperature difference between the fluid and the outside air. In this point, in a region C shown in FIG. 10, the temperature difference between the fluid and the inside wall surface is sufficiently large and hence the heat radiation amount is lame. However, since the fluid is deprived of heat by the fins 10 in a process in which the fluid flows between the fins 10, in a region D, the temperature difference between the fluid and the outside air becomes small and hence a sufficient heat radiation amount by the fins 10 cannot be secured. In other words, although the fins 10 in the region D have as large a heat radiation area as the fins 10 in the region C, a difference is caused in the heat radiation amount between the fins 10 in the region D and the fins 10 in the region C, which hence reduces a heat radiation efficiency in the fins 10 in the region D.

SUMMARY

The present disclosure addresses at least one of the above issues. Thus, it is an objective of the present disclosure to provide a battery pack capable of improving a heat radiation efficiency to an inside wall surface of a housing.

To achieve the objective of the present disclosure, there is provided a battery pack including a plurality of batteries, a housing, a fluid circulation part, a first fluid passage, and a first fin. The housing accommodates the plurality of batteries. The fluid circulation part is accommodated in the housing to circulate fluid for cooling the plurality of batteries in the housing. Fluid flows through the first fluid passage. The first fluid passage is provided between the plurality of batteries and a first inside wall surface serving as an inside wall surface of the housing. The first fin is formed on the first inside wall surface to protrude therefrom. The first fin exchanges heat between fluid and the first inside wall surface. The first fluid passage is divided between a first region that is a space where the first fin is arranged, and a second region that is a space where the first fin is not arranged. Fluid flows from the second region into the first region. The first fin includes an inflow port through which fluid flows into the first region, and an outflow port through which fluid flows out of the first region. The first fin is formed to extend from the inflow port to the outflow port. An area of the inflow port is larger than a cross-sectional area of the first fluid passage when viewed in a flow direction of fluid.

To achieve the objective of the present disclosure, there is also provided a battery pack including a plurality of batteries, a housing, a blower, a fluid passage, a plurality of fins, and an air duct. The housing accommodates the plurality of batteries. The blower circulates fluid for cooling the plurality of batteries in the housing. The fluid passage is formed between an inside wall surface of the housing and the plurality of batteries and extends in a predetermined direction along the inside wall surface. The plurality of fins protrude from the inside wall surface into the fluid passage. The air duct is connected to the blower and includes an blowout port. The fluid which has been blown out from the blower is blown out to the fluid passage through the blowout port. The blowout port has a shape extending along the inside wall surface in a direction that crosses the predetermined direction, and is arranged in a direction to blow out the fluid in the predetermined direction. The fluid flowing out from the blowout port flows in obliquely relative to an inflow plane formed by upstream end parts of the plurality of fins.

BRIEF DESCRIPTION OF DRAWINGS

The above and other objects, features and advantages of the present disclosure will become more apparent from the following detailed description made with reference to the accompanying drawings. In the drawings.

DETAILED DESCRIPTION

First Embodiment

Figure 1:
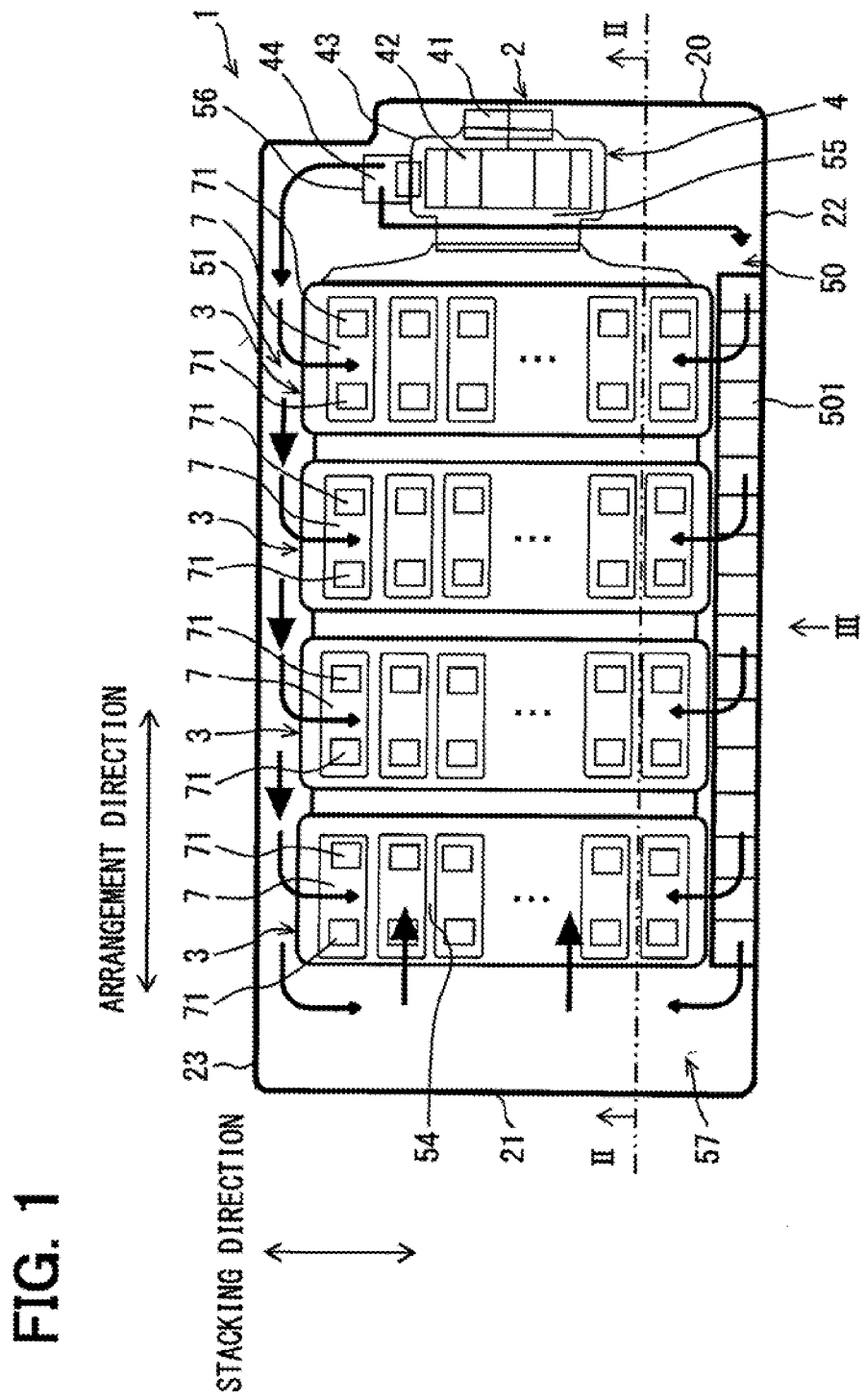
FIG. 1 is a general diagram, when viewed from a top wall side, to illustrate a construction of a battery pack and a flow of fluid in a case of a first embodiment.
Figure 2:
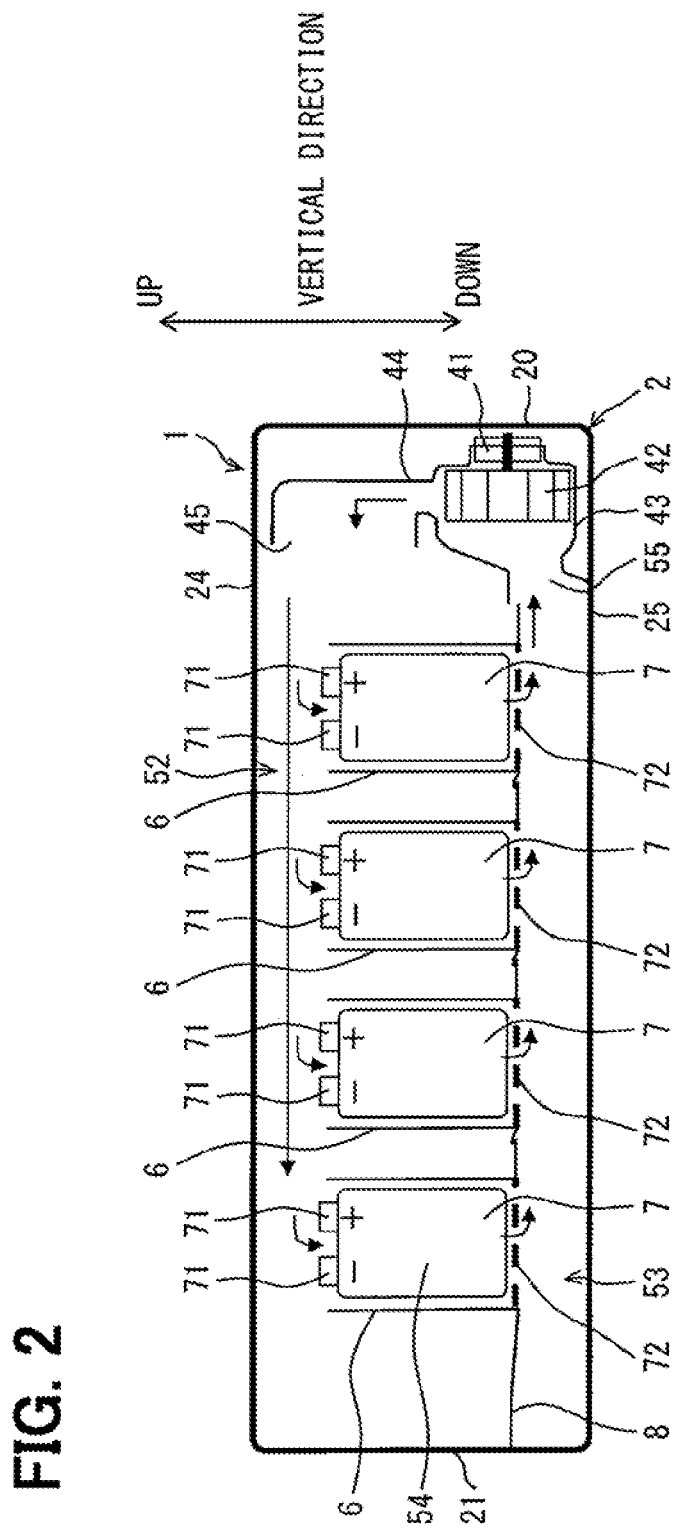
FIG. 2 is a section view taken on a line II-II in FIG. 1.

Hereinafter, a first embodiment will be described on the basis of the drawings. A battery pack 1 shown in FIG. 1 and FIG. 2 is used, for example, for a hybrid vehicle, whose running drive source is a combination of a motor driven with electric power charged in a battery and an internal combustion engine, and for an electric vehicle, whose running drive source is a motor. The battery pack 1 includes a case 2, a plurality of battery stacks 3, a blower 4, a fluid passage 5, and a collection duct 8.

The case 2 has a blower side wall part 20, an anti-blower side wall part 21, two connection wall parts 22, 23, a top wall 24, and a bottom wall 25. Hereinafter, these 20 to 25 will be collectively referred to as "6 wall surfaces". The blower side wall part 20 is a wall adjacent to the blower 4 which will be described. The anti-blower side wall part 21 is a wall formed on a side opposite to the blower 4 via a plurality of battery cells 7 which will be described later. The two connection wall parts 22, 23 are walls to connect the blower side wall part 20 to the anti-blower side wall part 21. In other words, there is formed a space (hereinafter referred to as "a first space") surrounded in four directions by the blower side wall part 20, the anti-blower side wall part 21, and the two connection wall parts 22, 23. In the two connection wall parts 22, 23, an up and down direction in FIG. 1 is a short side and a front and rear direction is a long side. The top wall 24 is a wall to close the first space from an upper side in FIG. 2. The bottom wall 25 is a wall to close the first space from a lower side in FIG. 2. In other words, the case 2 is formed in the shape of a box having 6 wall surfaces. A plurality of battery stacks 3 and the blower 4, which will be described later, are housed in the space surrounded by the 6 wall surfaces. Further, the case 2 is formed of an aluminum plate or an iron plate. In this regard, the case 2 corresponds to "a housing".

Each of the plurality of battery stacks 3 has a plurality of battery cases 6 and a plurality of battery cells 7. The plurality of battery stacks 3 are arranged at intervals of a specified space in a direction from the blower side wall part 20 to the anti-blower side wall part 21. Hereinafter, this direction is referred to as "an arrangement direction".

Each of the plurality of battery cases 6 houses the plurality of battery cells 7 which will be described later. In FIG. 1, each battery case 6 has its top side opened and has its bottom side connected to the collection duct 8 which will be described later.

The plurality of battery cells 7 are controlled by an electronic part (not shown in the drawing) used for charging and discharging electricity or for controlling a temperature. The electronic part is an electronic part and various kinds of electronic control devices controlled, for example, by a DC/DC converter, a motor to drive the blower 4, and an inverter. The electronic part may be housed in the case 2 or may be directly fixed to the case 2, thereby being arranged in the outside of the case 2. Each battery cell 7 has an electrode terminal 71 made of a negative terminal and a positive terminal, and the different terminals in two battery cells adjacent to each other are electrically connected to each other by a bus bar not shown in the drawing. The plurality of battery cells 7 are stacked and arranged in a direction from the one connection wall part 22 to the other connection wall part 23. Hereinafter, this direction is referred to as "a stacking direction".

The blower 4 plays a role of circulating fluid to cool the plurality of battery cells 7 housed in the case 2 in the fluid passage 5 which will be so described later. As the fluid to cool the battery cells 7 can be used, for example, air, various kinds of gases, water, and coolant. The blower 4 corresponds to an example of "a fluid circulation part". The blower 4 has a motor 41, a sirocco fan 42 driven by the motor 41, and a casing 43 having the sirocco fan 42 built therein, and the blower 4 has an air duct 44 connected to a blowout port thereof.

The sirocco fan 42, as illustrated in each drawing, is arranged in a lower portion of an inside space of the case 2 and in such a way to be close to the blower side wall part 20 of the case 2. The motor 41 is arranged between the blower side wall part 20 and the sirocco fan 42. A rotary shaft of the sirocco fan 42 is arranged in a position parallel to a longitudinal direction of the top wall 24 and the bottom wall 25 of the case 2. The casing 43 forms an inflow passage 55 and a blowout passage 56 which are parts of the fluid passage 5 which will be described later. The air duct 44 is connected to an upper portion of the casing 43 and is extended near to the top wall 24 and has an opening part 45 opened near the top wall 24 of the case 2.

The air duct 44 has a forked duct (not illustrated in the drawing) connected thereto. One of the forked ducts connects with a connection wall side passage 50 which will be described later, and the other of the forked ducts connects with a connection wall side passage 51 which will be described later. The fluid can be sent to the respective connection wall side passages 50, 51 by the forked duct.

The blower 4 is controlled by a control device including a battery monitoring unit (not shown in the drawing). The battery cell 7 is heated by itself at the time of output when current is taken out and at the time of input when current is charged. The control device always monitors a temperature of the battery cell 7 and controls the operation of the blower 4 on the basis of the temperature of the battery cell 7.

The fluid passage 5 is a passage in which the fluid to cool the plurality of battery cells 7 is circulated. The fluid passage 5 has the connection wall side passages 50, 51, a top wall side passage 52, a bottom wall side passage 53, a plurality of stack passages 54, the inflow passage 55, the blowout passage 56, and an anti-blower side passage 57. The connection wall side passages 50, 51 are respective spaces surrounded by the connection wall parts 22, 23, the plurality of battery stacks 3, the blower side wall part 20, the anti-blower side wall part 21, and the collection duct 8. The top wall side passage 52 is a space surrounded by the top wall 24, the plurality of battery stacks 3, the connection wall side passages 50, 51, the blower side wall part 20, and the anti-blower side wall part 21. The top wall side passage 52 is formed on an electrode terminal 71 side when viewed from the battery cell 7 in a direction (hereinafter referred to as "a vertical direction") orthogonal to both directions of the staking direction and the arrangement direction. The bottom wall side passage 53 is a space surrounded by the bottom wall 25, the collection duct 8 which will be described later, the connection wall side passages 50, 51, the blower side wall part 20, and the anti-blower side wall part 21. The bottom wall side passage 53 is formed on a side opposite to the electrode terminal 71 (hereinafter referred to as "an anti-electrode terminal side") when viewed from the battery cell 7 in the vertical direction.

The stack passage 54 is a space formed between the battery cells 7 adjacent to each other. The inflow passage 55 is a suction part of the sirocco fan 42, the suction part including a suction port of the casing 43 and extending in a rotary shaft direction of the sirocco fan 42. Air sucked by the sirocco fan 42 flows through the inflow passage 55.

The blowout passage 56 is a passage extending in a centrifugal direction of the fan, which is orthogonal to the rotary shaft of the sirocco fan 42, and is also a discharge part of the blower 4. The blowout passage 56 is a passage extending in a direction orthogonal to the inflow passage 55.

The anti-blower side passage 57 is a space formed between the battery stack 3, which is arranged in an anti-blower side end part in the arrangement direction, and the anti-blower side wall part 21. The connection wall side passages 50, 51 connect with the top wall side passage 52, respectively. The top wall side passage 52 connects with the plurality of stack passages 54. The plurality of stack passages 54 connect with the bottom wall side passage 53, respectively. The anti-blower side passage 57 connects with the two connection wall side passages 50, 51 and the top wall side passage 52. In each of the two connection wall side passages 50, 51, the vertical direction is a short side and the arrangement direction is a long side.

The collection duct 8 is a duct to connect an anti-electrode terminal side end part 72 of each battery cell 7, the inflow passage 55, the bottom wall 25, and the connection wall parts 22, 23. The collection duct 8 extends along the bottom wall 25 from below the battery stack 3 to the casing 43 and connects with the inflow passage 55. Further, the collection duct 8 also plays a role of a partition plate between the bottom wall side passage 53 and the connection wall side passages 50, 51. In other words, the bottom wall side passage 53 and the connection wall side passages 50, 51 are separated by the collection duct 8.

Next, a flow of the fluid in the battery pack 1 will be described. The fluid flowing out of the blowout passage 56 flows in the connection wall side passages 50, 51 along the connection wall parts 22, 23 in a direction from the blower side wall part 20 to the anti-blower side wall part 21. Hereinafter, in a process in which the fluid flows in the connection wall side passages 50, 51, an upstream side is referred to as "an upstream side in a flow direction" and a downstream side is referred to as "a downstream side in a flow direction". The flow of the fluid after flowing in the connection wall side passages 50, 51 is divided into a flow directly flowing into the top wall side passage 52 and a flow flowing through the anti-blower side passage 57 and then flowing into the top wall side passage 52. Then, the flow flows through the top wall side passage 52 and then into the stack passages 54. In other words, the top wall side passage 52 is an upstream side fluid passage when viewed from the battery cells 7. Further, in the top wall side passage 52, for the fluid flowing into the top wall side passage 52 from the connection wall side passage 50, the connection wall part 22 side is an upstream side and the connection wall part 23 side is a downstream side. In contrast, for the fluid flowing into the top wall side passage 52 from the connection wall side passage 51, the connection wall part 23 side is the upstream side and the connection wall part 22 side is the downstream side.

In each of the stack passages 54, the fluid flaws in a direction from the electrode terminal 71 to the anti-electrode terminal side end part 72 of the battery cell 7. In a process in which the fluid flows mainly in the stack passages 54, the fluid absorbs heat from the respective battery cells 7, whereby the heated battery cells 7 are cooled. The fluid arriving near the anti-electrode terminal side end part 72 in the stack passage 54 flows into the bottom wall side passage 53. In other words, the bottom wall side passage 53 is a downstream side passage when viewed from the battery cell 7.

In the bottom side passage 53, the fluid flows along the bottom wall 25 in a direction from the anti-blower side wall part 21 side to the blower side wall part 20 side. The fluid flowing in the bottom wall side passage 53 is sucked by the sirocco fan 42 from the inflow passage 55. In a process in which the flow flows in the fluid passage 5, the fluid is brought into contact with the two connection wall parts 22, 23, the top wall 24, and the bottom wall 25. Hence, the fluid exchanges heat with the two connection wall parts 22, 23, the top wall 24, and the bottom wall 25. The reason why the fluid flowing in the connection wall side passages 50, 51 becomes a flow flowing in the top wall side passage 52 and then flowing in the bottom wall side passage 53 is because the bottom side passage 53 connects with the inflow passage 55, in other words, becomes a negative pressure region.

Figure 3:
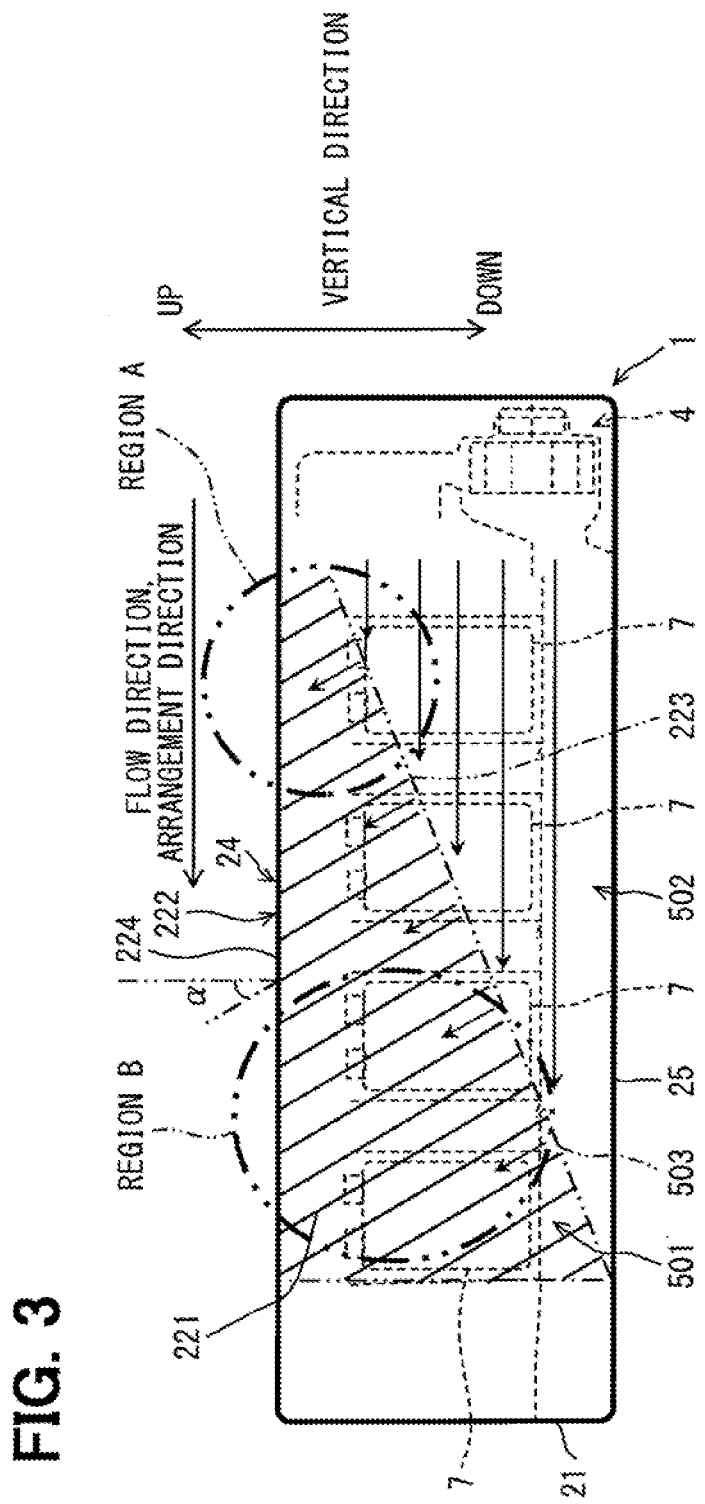
FIG. 3 is a general diagram to illustrate a first heat exchange passage part in FIG. 1 with a connection wall part removed from a view when viewed from a III arrow in FIG. 1.

As illustrated in FIG. 3, one connection wall side passage 50 has a first region 501 and a second region 502. In the first region 501, a plurality of fins 221 are formed in a protruding manner toward the interior of the battery pack 1 from an inside wall surface of the connection wall part 22. As shown in FIG. 1, the fins 221 formed in the first region 501 are formed in a way to protrude close to an end part of the connection wall side passage 50 side of the battery stack 3. Specifically, a space between the end part of the connection wall side passage 50 side of the battery stack 3 and the fin 221 is made smaller than a protruding length of the fin 221, which can hence restrain a large amount of fluid from flowing into the space. In this regard, the fins 221 may be formed integrally with the inside wall surface of the connection wall part 22 or may be joined to the inside wall surface of the connection wall part 22 with an adhesive or the like. In the second region 502, the fins 221 do not protrude toward the interior of the battery pack 1 from the connection wall part 22, and a wall surface of the connection wall part 22 is flat. In this regard, the connection wall part 22 corresponds to "a first inside wall surface" and "an inside wall surface", and the connection wall side passage 50 corresponds to "a first fluid passage" and "a fluid passage". Further, the fin 221 corresponds to "a first fin" and "a fin", and the first region 501 corresponds to "a first region", and the second region 502 corresponds to "a second region", respectively.

Each of the first region 501 and the second region 502 is formed nearly in the shape of a triangle when viewed from a direction vertical to the wall surfaces of the connection wall parts 22, 23. A width in the vertical direction of the first region 501 becomes larger from an upstream side to a downstream side in the flow direction of the fluid in the connection wall side passage 50. In other words, when a boundary part 503 between the first region 501 and the second region 502 is viewed from a direction vertical to the surfaces of the connection wall parts 22, 23, the boundary part 503 is formed in an inclined plane. The boundary part 503 corresponds to an inflow plane formed by the upstream side end parts of the plurality of fins 221.

On the downstream side of the connection wall side passage 50, the width in the vertical direction of the first region 501 is equal to a width in the vertical direction of the connection wall side passage 50. Further, a width in the vertical direction of the second region 502 becomes smaller from the upstream side to the downstream side in the flow direction of the fluid in the connection wall side passage 50. On the downstream side of the connection wall side passage 50, the width in the vertical direction of the second region 502 becomes zero. When the first region 501 is viewed from the vertical direction, the first region 501 is formed from a position opposite to the battery stack 3 at one end to a position opposite to the battery stack 3 at the other end in the arrangement direction. When the first region 501 is viewed from the stacking direction, the first region 501 is formed to a side closer to the battery stack 3 side than the blowout passage 56.

The plurality of fins 221 are straight fines and are formed in parallel to each other at intervals of a specified space. The fins 221 are used for accelerating heat exchange with the fluid when the fluid passes through the space between the fins 221. The straight fin here referred to means a fin formed in a nearly linear shape. The fins 221 are formed of a material having a comparatively excellent thermal conductivity such as aluminum and iron. In this regard, the kind of the fin 221 may be a louver fin or the like as well as the straight fin. The fins 221 include fins formed nearly linearly to a top wall side end part 222 of the connection wall part 22 from the boundary part 503 (inflow plane) and fins not formed to the top wall side end part 222. The fins not formed to the top wall side end part 222 are arranged in the most downstream region of the connection wall side passage 50. Further, the fins 221 are inclined in such a way that inflow ports 223 of inlets, through which the fluid flows into between the plurality of fins, are directed to the upstream side in the flow direction of the fluid in the connection wall side passage 50 and to a direction not parallel to the flow direction of the fluid in the connection wall side passage 50. In other words, a direction opposite to a direction (hereinafter referred to as "inflow direction") in which the fluid flows into the first region 501 (inflow port of the fins 221) is directed to the upstream side in the flow direction of the fluid in the connection wall side passage 50. Hence, the length of each fin 221 is shorter than the length of the long side of the connection wall side passage 50.

The fluid flows into the first region 501 from the second region 502. In other words, the fluid flows into the first region 501 from the inflow port 223 formed in the boundary part 503 (inflow plane) in the process in which the fluid flows in the connection wall side passage 50. The fluid flowing into the first region 501 flows down between the fins 221 in parallel to the inflow direction and flows out of the first region 501 through an outflow port 224. The fluid flowing out of the first region 501 between the fins 221 formed to the top wall side end part 222 directly flows into the top wall side passage 52. On the other hand, the fluid flowing out of the first region 501 between the fins 221 not formed to the top wall side end part 222 flows into the anti-blower side passage 57 and then flows into the top wall side passage 52. The fluid radiates heat to the fins 221 in the process in which the fluid flows between the fins 221. In this regard, in the connection wall side passage 50, a direction toward the anti-blower side wall part 21 from the blower side wall part 20 corresponds to "a flow direction of the fluid". Further, the vertical direction corresponds to "a direction orthogonal to both of the flow direction of the fluid and a vertical direction of the first inside wall surface". "The inflow direction" is a direction in which the fluid flows into the first region 501 and designates a direction in which the fluid flows in the inflow port 223.

Next, an operation and an effect produced by the battery pack of the present embodiment will be described.

(1) An area of the inflow port 223 is larger than a cross sectional area of the first fluid passage when viewed from the flow direction of the fluid. In other words, the area of the inflow port 223 through which the fluid flows into the first region 501 is larger than the comparative example. For this reason, a larger number of fins 221 than the comparative example can be formed, whereby the fluid, which is supplied from the blower 4 and has a high temperature, can be made to flow into all of the fins 221. Hence, the fluid having a sufficient temperature difference with respect to the outside air can be made to flow into all of the fins 221, so in a case where a heat radiation area equal to the comparative example can be secured by increasing the number of fins 221, a heat radiation efficiency can be improved as compared with the comparative example.

(2) By forming the first region 501, that is, the fins 221 in parallel to the flow direction of the fluid in the whole region of the connection wall side passage 50 like the comparative example, the heat radiation area between the fluid and the inside wall surface of the connection wall part 22 can be increased. Here, a heat radiation amount to the inside wall surface of the connection wall part 22 from the fluid is proportional to a flow rate of the fluid flowing into the first region 501 as well as the heat radiation area. Further, the flow rate is proportional to a cross sectional area through which the fluid passes. Hence, in order to improve a heat radiation performance, the cross sectional area needs to be increased. In this point, a cross sectional area through which the fluid passes in the comparative example is equal to a cross sectional area of the connection wall side passage 50 in the flow direction of the fluid (hereinafter referred to as "a comparative cross sectional area"). On the other hand, in the present embodiment, an area of the boundary part 503 between the first region 501 and the second region 502 is larger than a cross sectional area of the connection wall side passage 50 when viewed from the flow direction of the fluid and an inflow direction to the first region 501 is not parallel to the flow direction of the fluid. For this reason, a cross sectional area through which the fluid passes the first region 501 becomes larger than the comparative cross sectional area. Hence, in the present embodiment, as compared with the comparative example, a larger amount of fluid can be introduced into the first region 501 and hence a heat radiation performance can be improved.

(3) The inflow direction of the fluid to the first region 501 is not parallel to the flow direction of the fluid in the connection wall side passage 50 and a direction in which the fluid flows between the fins 221 is parallel to the inflow direction. In other words, a direction in which the fluid flows between the fins 221 is not parallel to t the flow direction of the fluid in the connection wall side passage 50. Further, in the connection wall side passage 50, the flow direction of the fluid is a long side. For this reason, as compared with the length of the fin in a case where the fins are formed on the whole surface of the connection wall part 22 opposite to the connection wall side passage 50 in parallel to the flow direction of the fluid as is the case with the comparative example, the lengths of the fins 221 in the present embodiment become shorter. Hence, even if the fluid exchanges heat with the fins 221 in the process in which the fluid flows between the fins 221 and hence the temperature of the fluid is decreased, in the present embodiment, a temperature difference between the fluid and the inside wall surface on the downstream side of the fins 221 becomes sufficiently larger as compared with the comparative example. For this reason, the fluid can sufficiently exchange heat with the inside wall surface even on the downstream side of the fins 221. Hence, even if a space volume occupied by the first region 501 is small, the heat radiation efficiency can be improved.

(4) As described above, in the present embodiment, the fins 221 are shorter in length as compared with the comparative example. For this reason, in the present embodiment, the resistance of the passage between the fins 221 is smaller than the comparative example. Hence, in the present embodiment, as compared with the comparative example, a larger amount of fluid can be introduced into the first region 501 and hence the heat radiation efficiency can be improved.

(5) The inflow port 223 of the fins 221 is inclined in such a way as to direct an upstream side of the flow direction of the fluid in the connection wall side passage 50 and in such a way as to direct to a direction not parallel to the flow direction of the fluid in the connection wall side passage 50. For this reason, as compared with a case where the inflow port 223 is directed to a direction orthogonal to the flow direction of the fluid in the connection wall side passage 50 or a case where the inflow port 223 is directed to a downstream side of the flow direction of the fluid in the connection wall side passage 50, an inflow resistance when the fluid flows into the inflow port 223 becomes smaller. Hence, the fluid can be smoothly introduced into the first region 501, which hence leads to improve the heat radiation efficiency.

(6) On the downstream side of the connection wall side passage 50, the width in the vertical direction of the first region 501 is equal to the width in the vertical direction of the connection wall side passage 50. For this reason, the fluid flowing in the connection wall side passage 50 flows into the first region 501 before the fluid arrives at the most downstream side from the upstream side of the connection wall side passage 50. Hence, as compared with a case where the width in the vertical direction of the first region 501 does not become equal to the width in the vertical direction of the connection wall side passage 50 before the fluid arrives at the most downstream side of the connection wall side passage 50, the fluid not flowing into the first region 501 can be decreased, which hence leads to improve the heat radiation efficiency.

(7) A space between the end part on the connection wall side passage 50 side of the battery stack 3 and the fins 221 is made smaller than the protruding length of the fin 221, which can restrain a large amount of fluid from flowing into the space. For this reason, the fluid can be introduced into the first region 501 more surely. Hence, it is possible to restrain the fluid from being not brought into contact with the fins 221 in the connection wall side passage 50 and hence to improve the heat radiation efficiency.

Second Embodiment

Hereinafter, a second embodiment will be described on the basis of the drawings. Descriptions of parts overlapping the first embodiment will be simplified or omitted.

Figure 4:
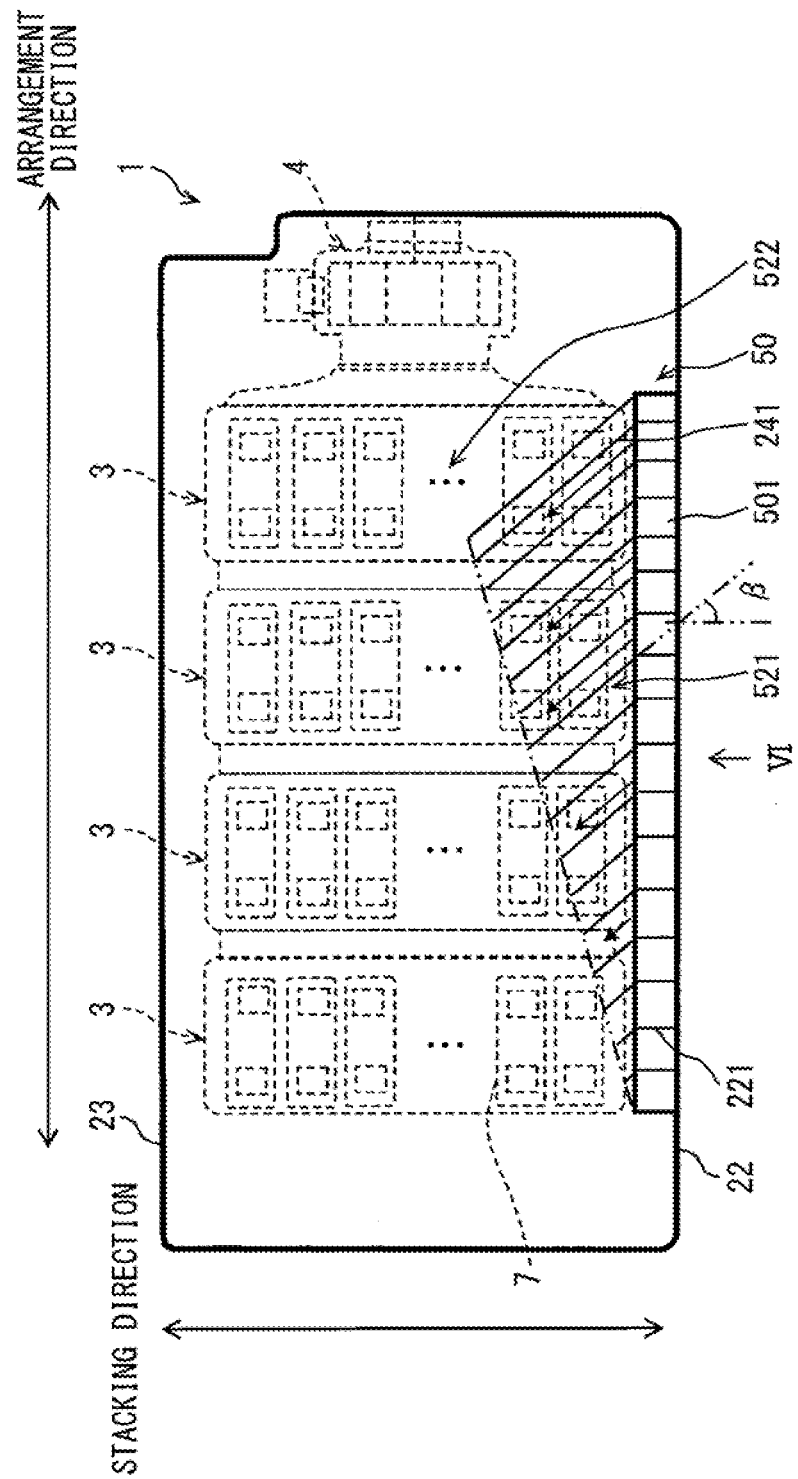
FIG. 4 is a general diagram, when viewed from a top wall side, to illustrate a second heat exchange passage part in a second embodiment.
Figure 5:
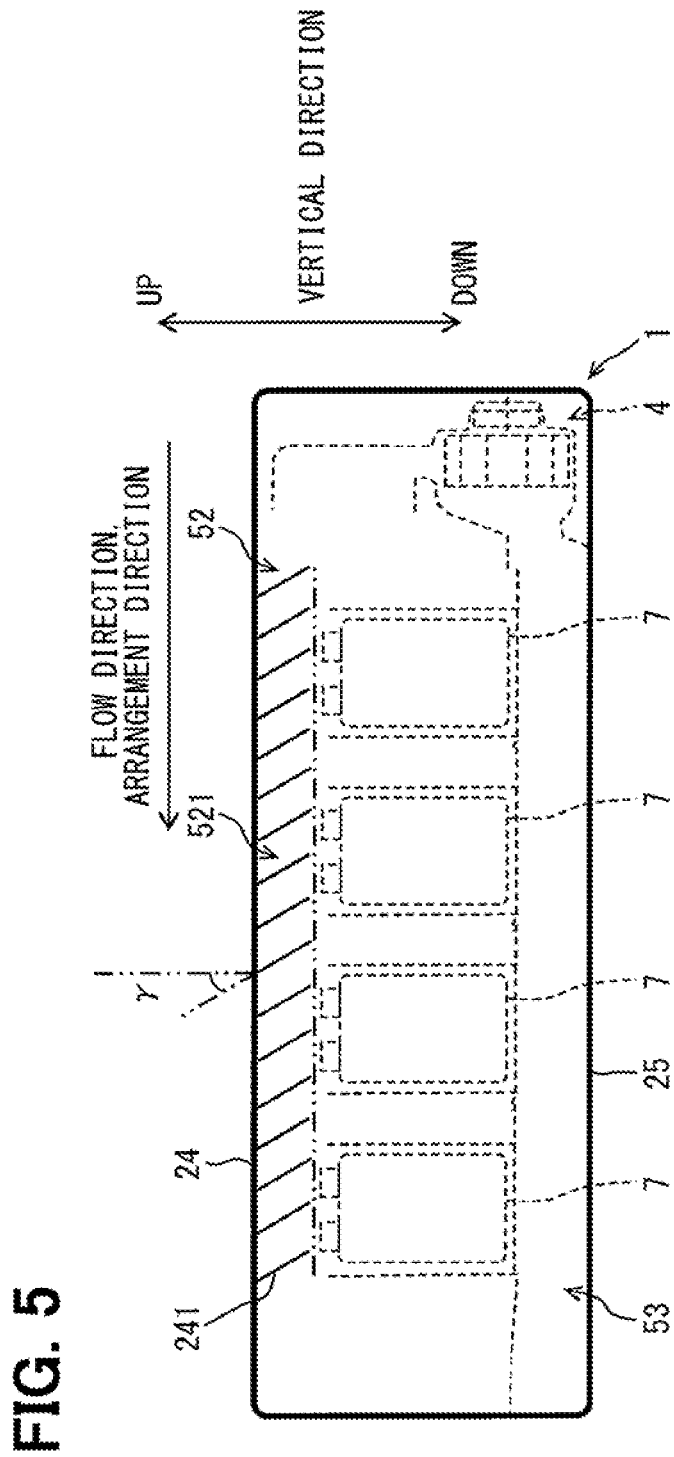
FIG. 5 is a general diagram with a connection wall part and a first heat exchange passage part removed from a view when viewed from a VI arrow in FIG. 4.

As shown in FIG. 4, the top wall side passage 52 has a third region 521 and a fourth region 522. In the third region 521, a plurality of fins 241 are formed in a way to protrude toward the interior of the battery pack 1 from the inside wall surface of the top wall 24. As shown in FIG. 5, each of the fins 241 formed in the third region 521 is formed in a way to protrude close to an end part of the top wall side passage 52 side of each of the battery stacks 3. Specifically, a space between the end part of the top wall side passage 52 side of the battery stack 3 and the fin 241 is made smaller than a protruding length of the fin 241, which hence can restrain a large amount of fluid from flowing into the space. In this regard, the fins 241 may be formed integrally with the inside wall surface of the top wall 24 or may be separately fixed to the inside wall surface of the top wall 24. In the fourth region 522, the fins 224 do not protrude toward the interior of the battery pack 1 from the top wall 24 and a wall surface of the top wall 24 is flat. In this regard, the top wall 24 corresponds to "a second inside wall surface" and the top wall side passage 52 corresponds to "a second fluid passage". Further, the fin 241 corresponds to "a second fin" and the third region 521 corresponds to "a third region", respectively.

Each of the third region and the fourth region 522 is formed nearly in the shape of a triangle when viewed from a direction vertical to the wall surface of the top wall 24. The third region 521 is formed continuously with the first region 501. The fourth region 522 is a region other than the third region 521 in the top wall side passage 52. Here, "continuously" means that a space is not formed between the fins 221 and the fins 241. When viewed from a direction vertical to the wall surface of the top wall 24, the third region 521 is formed on the connection wall side passage 50 side. On the other hand, when viewed from a direction vertical to the wall surface of the top wall 24, the fourth region 522 is formed on the connection wall side passage 51 side. A width in the arrangement direction of the third region 521 becomes gradually smaller from the connection wall part 22 side, which is an upstream side in the top wall side passage 52 for the fluid flowing into the top wall side passage 52 from the connection wall side passage 50, to the connection wall part 23 side of a downstream side in the top wall side passage 52. Hereinafter, of three sides of the third region 521 when viewed from the vertical direction, a side on the connection wall part 22 side is referred to as "a first side", and a side on the blower side wall part 20 side is referred to as "a second side", and a side on the anti-blower side wall part 21 side is referred to as "a third side".

The plurality of fins 241 are straight fins and are formed at intervals of a specified space in parallel to each other. The fins 241 are used for accelerating to heat exchange between the fluid and the fins 241 when the fluid passes between the fins 241. Here, the "straight fin" means a fin formed nearly in a linear shape. In this regard, the kind of the fin 241 may include a louver fin or the like. The fins 241 are formed of a material having a comparatively excellent thermal conductivity such as aluminum and iron. Each of the fins 241 is formed in the nearly linear shape from the first side to the third side. Further, when viewed from the vertical direction, an inclined angle β with respect to the stacking direction of the fins 241 is the same angle as an inclined angle α with respect to the vertical direction of the fins 221. As shown in FIG. 5, an inclined angle γ of the fins 241 with respect to the vertical direction when viewed from the stacking direction is the same angle as the inclined angle α with respect to the vertical direction of the fins 221. In other words, the inclined angle γ of the fins 241 with respect to the vertical direction when viewed from the stacking direction is the same angle as the inclined angle β with respect to the stacking direction of the fins 241 when viewed from the vertical direction.

In the top wall side end part 222, the fins 241 are formed at positions opposite to positions in which the fins 221 are formed when viewed from the stacking direction. In other words, each space between the fins 221, which becomes a passage of the fluid in the first region 501, and each space between the fins 241, which becomes a passage of the fluid in the third region 521, are formed at positions opposite to each other.

Figure 6:
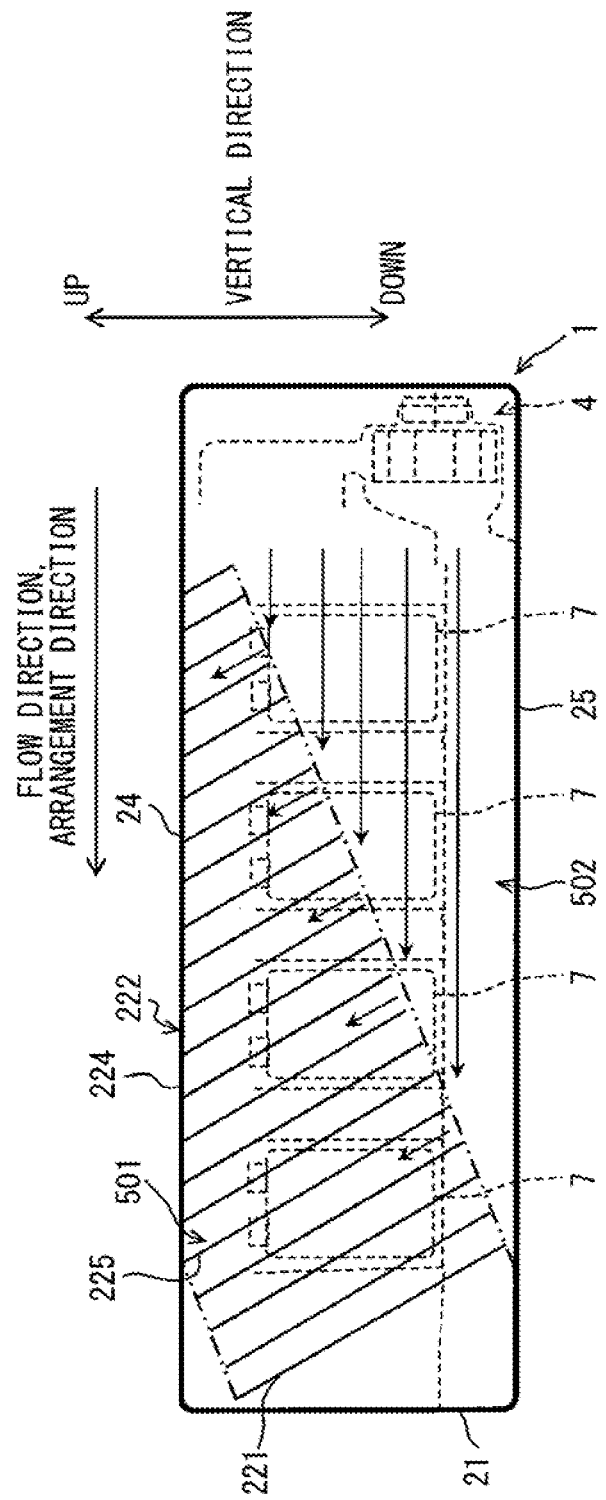
FIG. 6 is a general diagram to illustrate the first heat exchange passage part in FIG. 4 with a connection wall part removed from a view when viewed from a VI arrow in FIG. 4.

As shown in FIG. 6, of the fins 221, the fins at positions where the fluid does not flow directly to the top wall side passage 52 through between the fins 221 are formed only in the same length as the longest fin 225 of the plurality of fins 221 in the first region 501.

Figure 7:
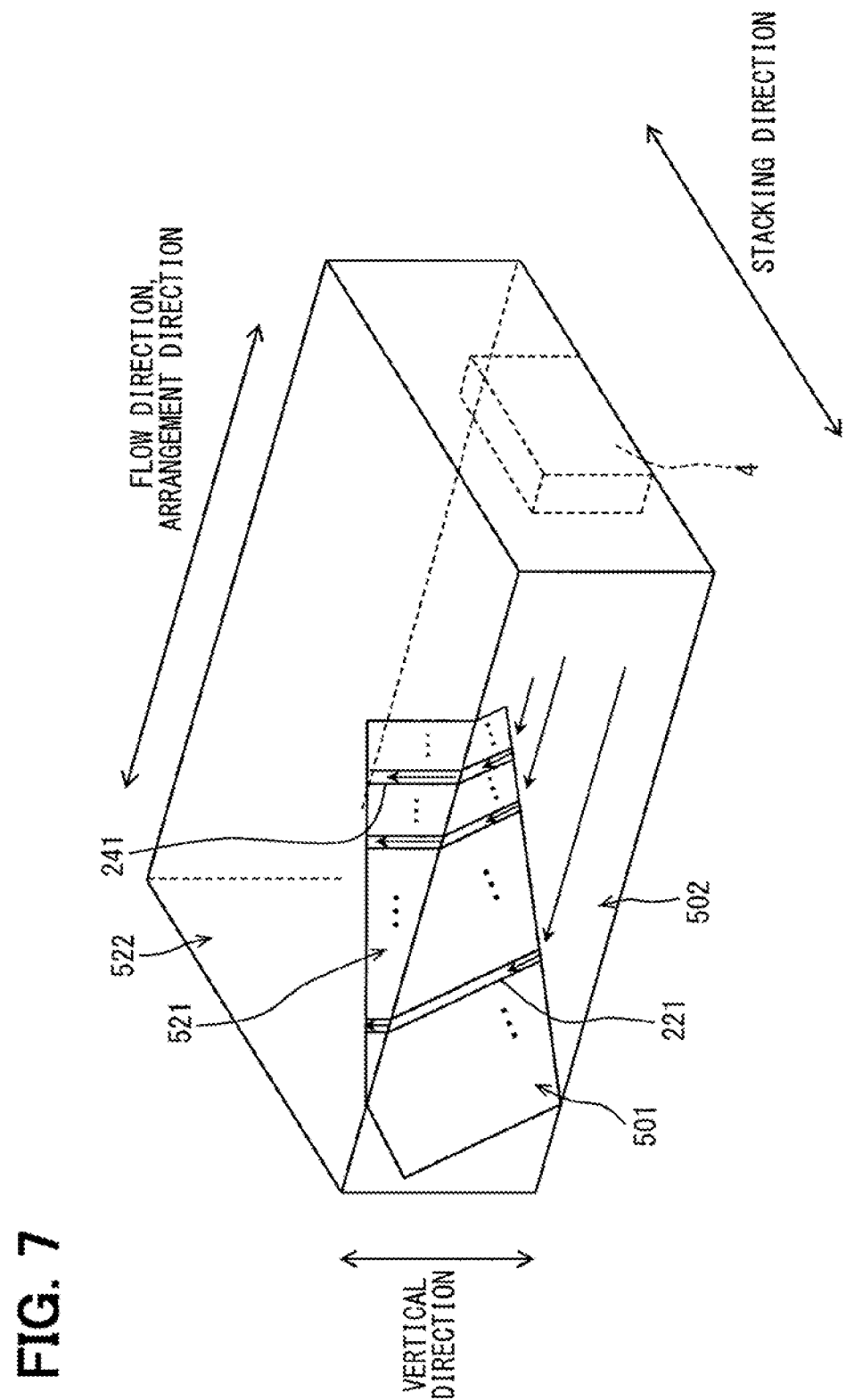
FIG. 7 is a schematic diagram to illustrate a flow of fluid in the first heat exchange passage part and in the second heat exchange passage part in the second embodiment.

Next, the flow of the fluid in the first region 501 and the third region 521 will be described on the basis of FIG. 7. The fluid flowing down in the first region 501 flows into each space between the fins 241 opposite to each space between the fins 221. In this way, the fluid results in flowing into the third region 521. The fluid flowing down in the third region 521 flows out of the third regions 521 from the third side and flows into the stack passages 54 as appropriate. Needless to say, there is also some fluid flowing into the stack passages 54 in the middle of flowing in the third region 521 before the fluid arrives at the third side. In the process in which the fluid flows between the fins 241, the fluid radiates heat to the fins 241.

The sum of a path length of the fluid in the first region 501 and a path length of the fluid in the third region, which is formed at a position opposite to the each path of the first region is an equal value irrespective of the inflow port of the first region 501 through which the fluid flows into the first region 501. In other words, a distance which the fluid passes from the time when the fluid flows in from the inflow port of the first region 501 to the time when the fluid flows out from the third side of the third region 521 is an equal value irrespective of the inflow port of the first region 501 through which the fluid flows into the first region 501. In this regard, the "equal value" in this case may be not necessarily a completely equal value but, as will be described later, may be an equal value of a degree in which, depending on the position of the inflow port 223, a variation in an air flow resistance is within a specified range. The specified range is a numerical range set as appropriate in the performance of the battery pack 1.

Next, an operation and an effect produced by the battery pack 1 of the present embodiment will be described.

(1) Generally, as a path is shorter in a path length of the fluid, the path smaller in a flow resistance. For this reason, in a case where the path length of the fluid is different depending on the position of the inflow port like the first region 501 of the first embodiment, the fluid may intensively flow into a path of a short path length, that is, a region A in FIG. 3. In this case, a heat exchange in a path of a long path length in the first region 501, that is, in a region B in FIG. 3 cannot be accelerated, so the heat exchange is not efficiently performed. Hence, in the present embodiment, the sum of the path length of the fluid in the first region 501 and the path length of the fluid in the third region, which is formed at the position opposite to the each path of the first region is an equal value irrespective of the inflow port of the first region 501 through which the fluid flows into the first region 501. For this reason, it is possible to restrain a variation in the flow resistance at the position of the inflow port and hence to inhibit the fluid from intensively flowing into a specified inflow port. Hence, it is possible to effectively use all of the fins 221 formed in the first region 501 and hence to improve the heat radiation performance.

(2) When the fins 241 are viewed from the stacking direction, the fins 241 are formed at the same inclined angle as an inclined angle with respect to the vertical direction of the fins 221. For this reason, as compared with a case where the fins 241 and the fins 221 are different from each other in the inclined angle, the fluid can be smoothly introduced into the third region 521 from the first region 501. Hence, it is possible to improve the heat radiation performance.

(3) In the present embodiment, in addition to the first region 501, the third region 521 is formed. For this reason, as compared with the first embodiment, many fins used for exchanging heat with the fluid are formed. Hence, as compared with the first embodiment, it is possible to improve the heat radiation performance.

(4) The space between the end part on the top wall side passage 52 side of the battery stack 3 and the fin 241 is made smaller than the protruding length of the fin 241, which can hence restrain a large amount of fluid from flowing into the space. For this reason, the fluid can be introduced into the third region 521 with more reliability. Hence, in the top wall side passage 52, it is possible to restrain the fluid from being not brought into contact with the fins 241 and hence to improve the heat radiation performance.

In addition, the same operation and the same effect as the first embodiment can be produced.

Third Embodiment

Hereinafter, a third embodiment will be described on the basis of FIG. 11 to FIG. 18. Descriptions of parts overlapping the embodiments described above will be simplified or omitted.

Figure 11:
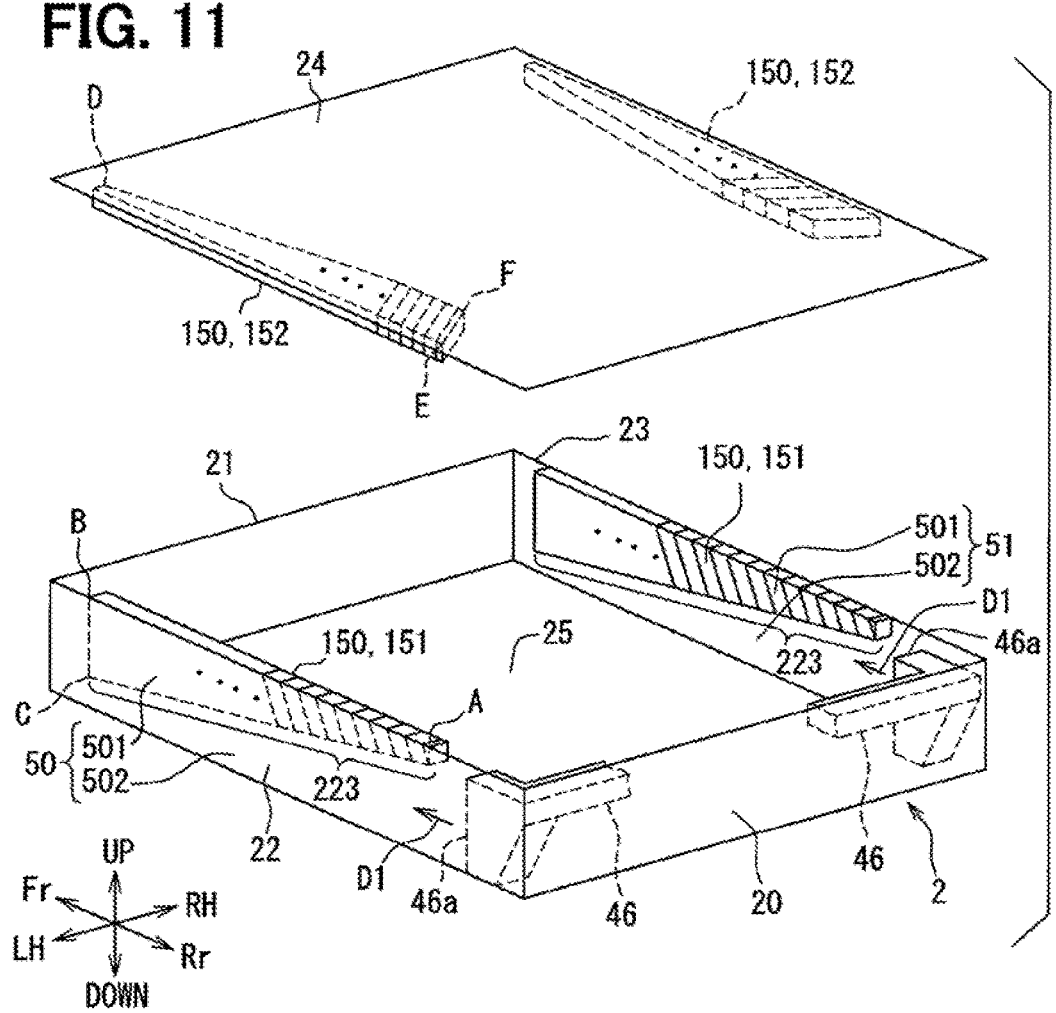
FIG. 11 is an exploded perspective view to illustrate a case and inside fins according to a third embodiment.
Figure 12:
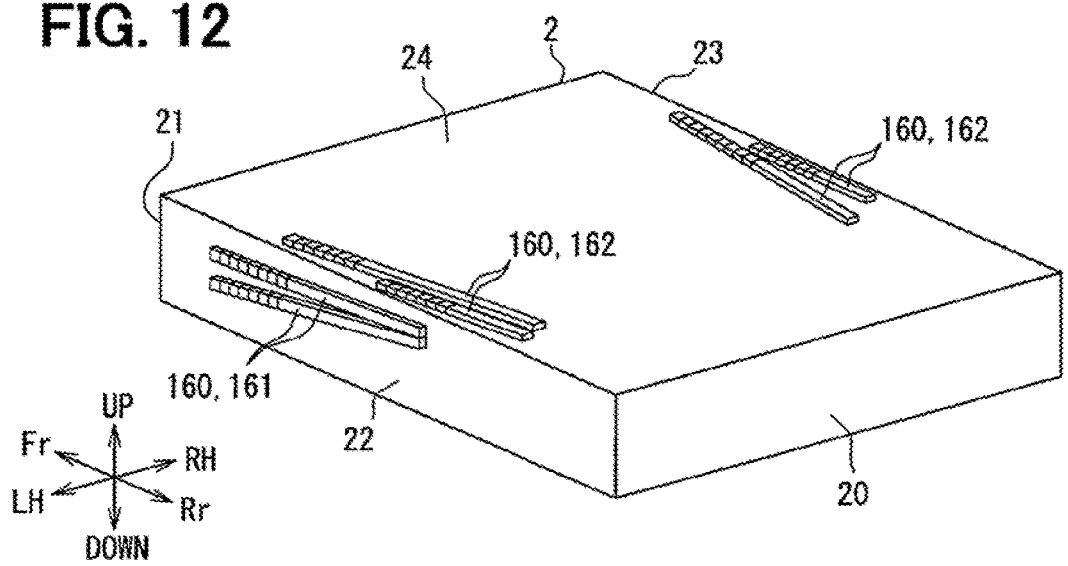
FIG. 12 is a perspective view to illustrate the case and outside fins according to the third embodiment.

In a battery pack according to the present embodiment, a case 2 has inside fins 150 (151, 152) arranged on an inside surface thereof and has outside fins 160 (161, 162) arranged on an outside surface thereof (see FIG. 11 and FIG. 12). Further, the case 2 has an outside duct 170 and an outside blower 172 fixed to an outer surface thereof (see FIG. 13). The outside fins 160 are positioned in the outside duct 170. The outside blower 172 sends air outside the case 2 to the outside duct 170.

Figure 13:
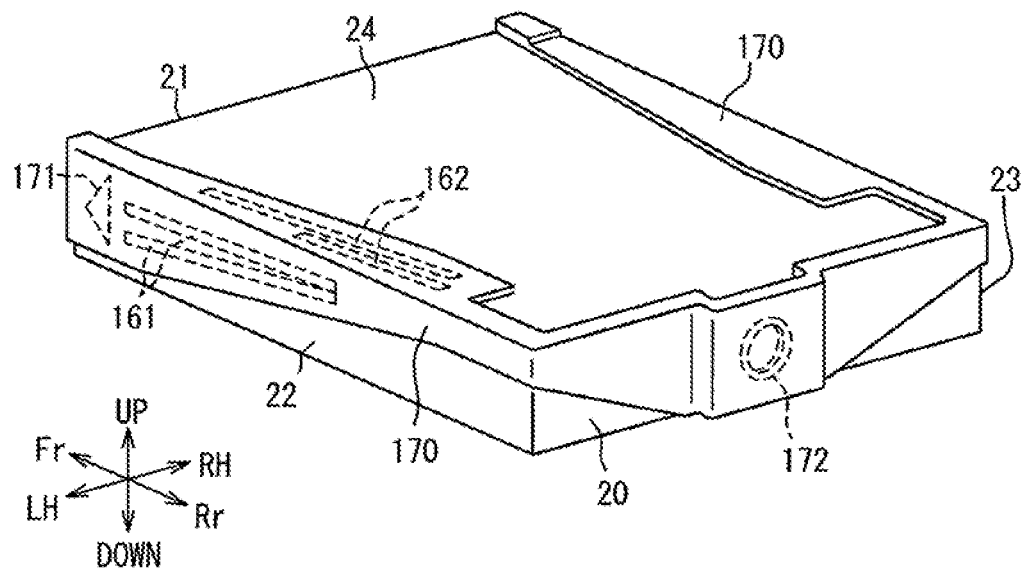
FIG. 13 is a perspective view to illustrate the case and an outside duct according to the third embodiment.

Here, in the present embodiment, in FIG. 11 to FIG. 13, Fr designates a vehicle front side, and Re designates a vehicle rear side, and RH designates a vehicle right side, and LH designates a vehicle left side. When a direction in a battery pack 100 is shown, a Fr-Rr direction is referred to as a front and rear direction, a RH-LH direction is referred to as a left and right direction. Further, a direction in which the gravity is applied is referred to as an up and down direction.

The inside fins 150, as shown in FIG. 11, are fins arranged on the inside of the case 2 and for accelerating the heat exchange and includes first inside fins 151 and second inside fins 152. Each of the inside fins 151, 152 is formed of a material having an excellent thermal conductivity such as aluminum or iron.

The first fins 151 are arranged on the connection wall part 22 side and on the connection wall part 23 side in such a way as to be symmetric with respect to a center line directing in the front and rear direction of the case 2. Further, the inside fins 152 are arranged on two positions of the connection wall part 22 side and on the connection wall part 23 side of the top wall 24 in such a way as to be symmetric with respect to the center line directing in the front and rear direction of the case 2. The first fin 151 corresponds to "a first fin" and "a fin", and the second fin 151 corresponds to "a second fin", respectively.

Here, there are employed for the respective inside fins 151, 152, for example, straight fins for which a flow resistance to the fluid can be set comparatively small. In the straight fins, many fin parts, each of which is shaped like a thin plate protruding vertically from a base plate part shaped like a thin plate, are arranged in parallel to each other to thereby form passages for the fluid between the respective fin parts. In this regard, the inside fins 151, 152 can be made of not only the straight fins but also other corrugated fins (having a louver or no louver) and offset fins.

The base plate part of the first inside fins 151 is formed in the shape of a long and narrow right triangle A, B, C, and an angle formed by A-B-C is nearly a right angle. A length of a long side A-B extending in the front and rear direction is set at a length nearly equal to a length in the stacking direction of the battery stacks 3. Further, a length of a short side B-C extending in the up and down direction is set at a length a little smaller than a size in the up and down direction of the connection wall parts 22, 23. The base plate part of the first inside fins 151 is arranged in such a way that the position of the front and back direction corresponds to the position of the battery stacks 3. The base plate part of the first inside fins 151 is arranged in such a way that: the short side B-C is positioned on the anti-blower side wall part 21 side; an apex angle B-A-C opposite to the short side B-C is positioned on the blower side wall part 20 side; and the long side A-B is along the upper sides of the connection wall parts 22, 23. The base plate part of the first inside fins 151 is joined to the respective inside surfaces of the connection wall parts 22, 23. Hence, an inclined side C-A of the base plate part of the first inside fins 151 is a side inclined down to the anti-blower wall part 21 side from the blower side wall part 20 side.

The fin parts of the first inside fins 151 protrude vertically toward the plurality of battery cells 7 from the base plate part, and have their protruding tip parts extended to positions close to the side surfaces of the plurality of battery cells 7 in such a way that a larger amount of fluid flows in the fin parts. Further, plate surfaces of the fin parts are set in such a way as to be inclined to the anti-blower side wall part 21 side toward an upper side from a lower side with respect to the up and down direction. Further, a length of a fluid passage formed by the fin parts is made longer to the anti-blower side wall part 21 side from the blower side wall part 20 side.

On the other hand, a base plate part of the second inside fins 152 is formed in the shape of a long and narrow triangle D, E, F. A length of a long side D-E extending in the front and rear direction is set at a length nearly equal to a length of a long side A-B of the base plate part of the first inside fins 151. The base plate part of the second inside fins 152 is arranged in such a way that the position of the front and rear direction corresponds to the position of the first inside fins 151. The base plate part of the second inside fins 152 is arranged in such a way that: a short side E-F is positioned on the blower side wall part 20 side; an apex angle E-D-F opposite to the short side E-F is positioned on the anti-blower side wall part 21 side; and the long side D-E is along a side in the front and rear direction in the top wall 24. The base plate part of the second inside fins 152 is joined to the inside surface of the top wall 24 in such a way as to be adjacent to the fin parts of the first inside fins 151.

The fin parts of the second inside fins 152 protrude vertically toward the plurality of battery cells 7 side from the base plate part and have their protruding tip portions extended to a position close to the upper surfaces of the plurality of battery cells 7 in such a way that a larger amount of fluid flows in the fin parts. Further, the plate surfaces of the fin parts are set in such a way that as the plate surfaces of the fin parts are closer to the central side of the case 2, the plate surfaces of the in parts are more inclined to the anti-blower side wall part 21 side with respect to the left and right direction. As the fluid passages formed by the fin parts are closer to the anti-blower side wall part 21 side from the blower side wall part 20 side, the fluid passages become shorter in length. The fluid passages formed by the fin parts of the second inside fins 152 are connected to the fluid passages formed by the fin parts of the first inside fin parts 151 in such a way as to connect with each other.

The outside fins 160, as shown in FIG. 12, are fins arranged on the outside of the case so as to accelerate heat exchange and include first outside fins 161 and second outside fins 162. The respective outside fins 161, 162 are formed of a material having an excellent thermal conductivity such as aluminum or iron.

The first outside fins 161 are arranged on the connection wall part 22 side and the connection wall part 23 side in such a way as to be symmetric with respect to a center line in the front and rear direction of the case 2. Further, the second outside fins 162 are arranged on the connection wall part 22 side and the connection wall part 23 side of the top wall 24 in such a way as to be symmetric with respect to the center line in the front and rear direction of the case 2.

Figure 14:
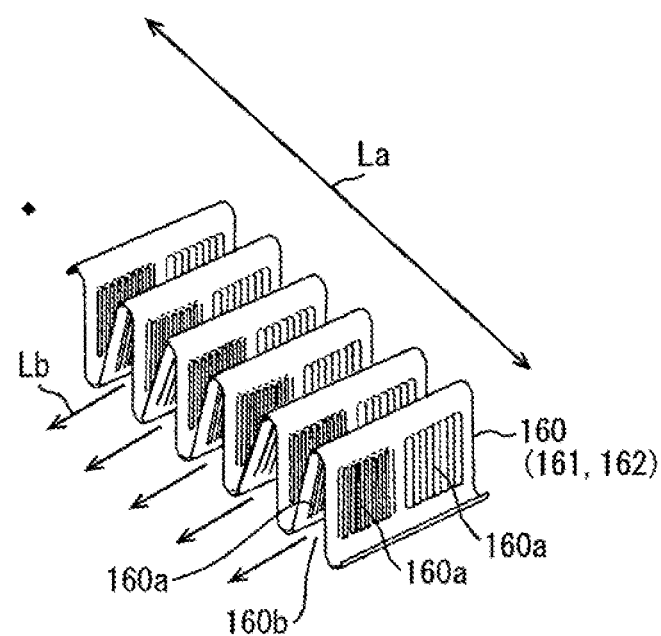
FIG. 14 is a perspective view to illustrate the outside fins according to the third embodiment.

Here, as the outside fins 161, 162 are employed, for example, corrugated fins for which a flow thermal conductivity performance to the fluid can be set comparatively large (see FIG. 14). The corrugated fin has its whole shape formed in a wavy shape and has many louvers 160a formed on wavy surfaces opposite to each other. The corrugated fin has corrugated passages 160b of fluid passages formed between the wavy surfaces opposite to each other. Further, a part of the fluid flowing in the corrugated passages 160b passes and flows through the louvers 160a in a direction to pass through the wavy plate surfaces. A direction in which the fluid flows through the corrugated passages 160b and in which the corrugated passages 160b extend and a direction La in which the waves are connected are orthogonal to each other.

In the first outside fins 161, a plurality of fins (here, two fins) are arranged in one set. The first outside tins 161 are arranged in a region corresponding to the first inside fins 151 in the connection wall parts 22, 23 in such a way that the direction (La) in which the waves are connected is directed in the front and rear direction and in such a way as to be slightly offset to the anti-blower side wall part 21 side.

In the second outside fins 162, a plurality of fins (here, two fins) are arranged in one set. The second outside fins 162 are arranged in a region corresponding to the second inside fins 152 in the connection wall parts 22, 23 side of the top wall 24 in such a way that the direction (La) in which the waves are connected is directed in the front and rear direction and in such a way as to be slightly closer to the blower side wall part 20 side than the first outside fins 161.

Figure 15:
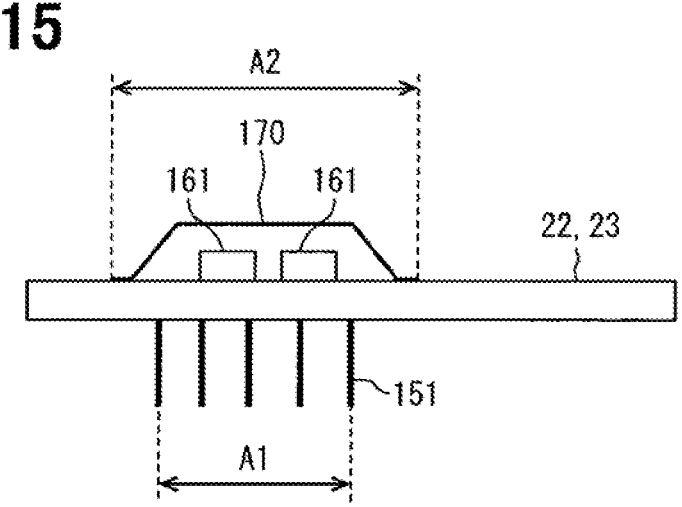
FIG. 15 is a section view to schematically illustrate a position relationship between an inside fin range and an outside duct range in the third embodiment.

The outside duct 170, as shown in FIG. 13 and FIG. 15, is a duct to make fluid for cooling flow along the outside surface of the case 2. As the fluid for cooling is used, for example, air-conditioned air (air cooled by air conditioning) in a vehicle compartment.

The outside duct 170 has its cross sectional shape formed in a flat shape and is arranged on the outside surface of the case 2, specifically, in a connection wall parts 22, 23 region, in a region on the connection wall parts 22, 23 side of the top wall 24, and in a blower side wall part 20 region. The outside duct 170 is formed in such a way as to surround (cover) the respective outside fins 161, 162. An interior of the outside duct 170 forms a flow passage mainly connecting with the connection wall parts 22, 23 region, the region on the connection wall parts 22, 23 side of the top wall 24, and the blower side wall part 20 region in this order.

The outside duct 170 has both end parts (connection wall part 22, 23 sides) on the anti-blower side wall part 21 side thereof formed in suction parts for sucking air-conditioned air. Then, on the downstream side immediately after the suction part is arranged an air branching part 171 that branches the sucked air-conditioned air into a lower side of the first outside fins 161 and a center side of the case 2 of the second outside fins 162.

Further, the outside duct 170 has the outside blower 172 arranged in the center on the blower side wall part 20 side thereof. The outside blower 172 has its upper part and lower part formed in blowout parts to blow out the air-conditioned air. As the outside blower 172 is used, for example, a turbofan.

Figure 16:
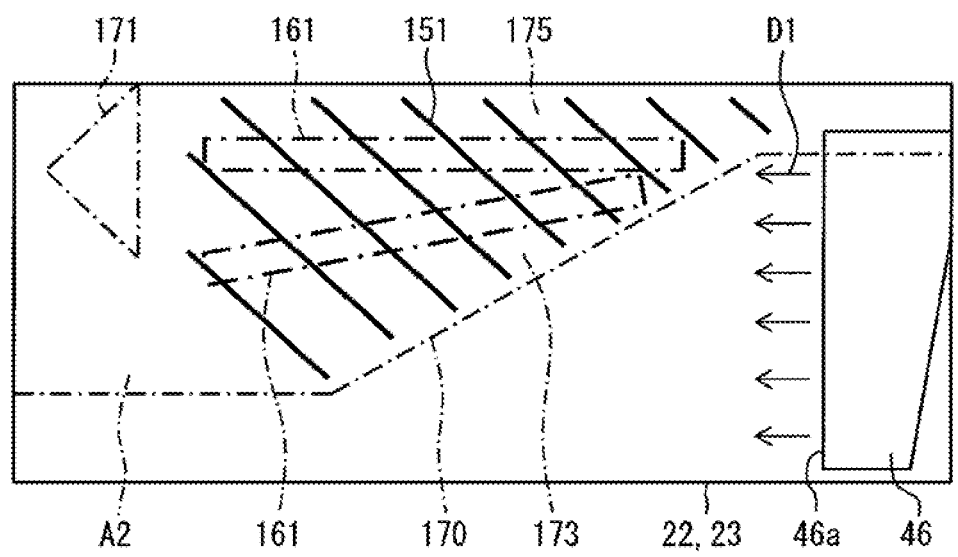
FIG. 16 is a front view to schematically illustrate a position relationship between the inside fin range and the outside duct range in the third embodiment.

FIG. 16 is a schematic illustration when the connection wall part 22 is viewed from inside. Single dot and dash lines in the drawing show positions in which the first outside fins 161, the outside duct 170, and the air branching part 171 are fixed. As shown in FIG. 15 and FIG. 16, of the connection wall parts 22, 23, a range in which the first inside fins 151 are fixed is referred to as an inside fin range A1. Further, of the connection wall parts 22, 23, a range covered with the outside duct 170 is referred to as an outside duct range A2.

In the present embodiment, the first outside fins 161 and the outside duct 170 are arranged in such a way that the whole of the inside fin range A1 is included in the outside duct range A2. Further, of the top wall 24, the whole of a range in which the second inside fins 152 are arranged overlaps a part covered with the outside duct 170 of the top wall 24. In other words, of the case 2, the whole of the range in which the inside fins 150 are arranged is covered with the outside duct 170.

Further, the first outside fins 161 are arranged at positions overlapping the first inside fins 151 when viewed from the vertical direction with respect to the wall surfaces of the connection wall parts 22, 23. Specifically, the whole of the first outside fins 161 overlap the first inside fins 151. When the second outside fins 162 are viewed from the vertical direction with respect to the wall surface of the top wall 24, the second outside fins 162 are arranged at positions overlapping the second inside fins 152. Specifically, the whole of the second outside fins 162 overlap the second inside fins 152.

The operation of the battery pack 100 constructed in the manner described above will be described with reference to FIG. 16 to FIG. 18.

The battery cell 7 is heated by itself at the time of output when current is taken out and at the time of input when current is charged. Further, the battery cell 7 is affected by temperature outside the case 2 according to a season. A battery management unit always monitors the temperatures of the battery cells 7 in the battery pack 100 by a temperature sensor and controls the operations of the respective blowers 4 and the outside blower 172 on the basis of the temperatures of the battery cells 7. In this regard, in the first embodiment described above, the fluid is circulated to all of the battery cells 7 housed in the case 2 by one blower 4. However, in the present embodiment, the fluid is circulated by two blowers 4. Specifically, the fluid is circulated in the region of the connection wall side part 22 and in the region of the connection wall part 23 of the fluid passage 5 formed in the case 2 by the respective blowers 4 in a shared manner.

Each of the blowers 4 has an air duct 46 connected to its blowout port. As shown in FIG. 11, the air ducts 46 introduce the fluid blown out from the blowers 4 to the connection wall side passages 50, 51, respectively. The connection wall side passages 50, 51 are passages formed between the connection wall parts 22, 23 (inside wall surfaces) of the case 2 and the battery cells 7 and correspond to the fluid passages extended in a specified direction along the connection wall parts 22, 23. The specified direction designates the front and rear direction shown in FIG. 11 and corresponds to the flow direction and the arrangement direction according to the first embodiment described above.

Each of the blowout ports 46a of the air ducts 46 is formed in a shape extended along each of the connection wall parts 22, 23 in a direction to cross the specified direction of the air duct 46 and is arranged in a direction to blow out the fluid in the specified direction. Each of the blowout ports 46a is arranged in a direction to blow out the fluid in the specified direction. In short, a blowout direction D1 in which the fluid blows out from the blowout port 46a (see FIG. 11 and FIG. 16) matches a longitudinal direction (specified direction) of each of the connection wall side passages 50, 51. Further, each of the blowout parts 46a is formed in a shape extended along each of the connection wall parts 22, 23 in a direction to cross the specified direction (passage width direction). In the example shown in FIG. 11, a passage width direction is the up and down direction.

The blowout port 46a of the air duct 46 is constructed in such a way that the fluid flowing out from the blowout port 46a flows into, in a manner inclined to, an inflow plane formed by the upstream end parts of the plurality of first inside fins 151, in other words, a boundary part 503. A flow direction of the fluid flowing between the plurality of first inside fins 151 crosses the blowout direction D1 In other words, the direction of the first inside fins 151 is set in such a way that the longitudinal direction of the first inside fins 151 crosses the blowout direction D1.

The battery management unit applies voltage to the respective blowers 4 according, to the temperatures of the battery cells 7 to thereby activate the sirocco fan 42. Further, if the temperatures of the battery cells 7 are not less than a specified temperature, the outside blower 172 is activated along with the respective blowers 4 in some cases.

Specifically, the battery management unit switches between a low heat radiation mode in which the respective blowers 4 are activated with the outside blower 172 stopped and a high heat radiation mode in which both of the outside blower 172 and the respective blowers 4 are activated.

Figure 17:
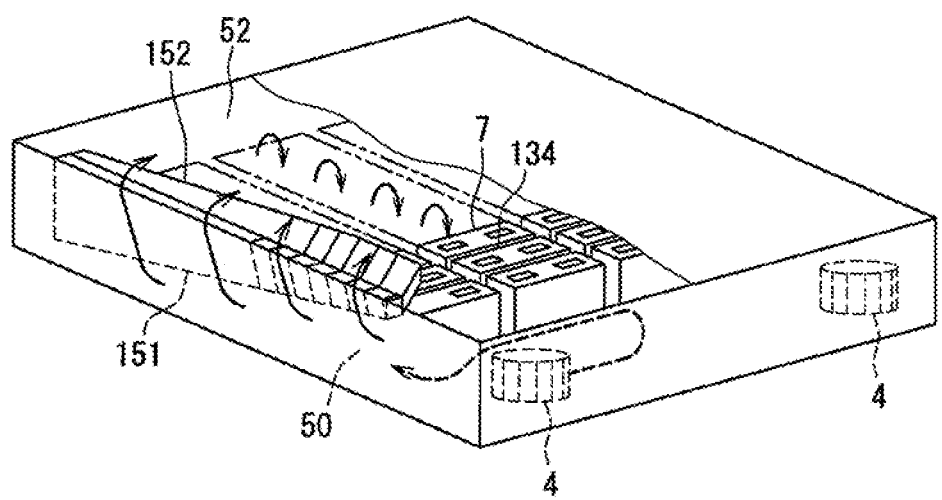
FIG. 17 is a perspective view to illustrate a flow of fluid by the inside fins in the third embodiment.

As described above, in a case where only the respective blowers 4 are activates in the low heat radiation mode, the fluid in the case 2 is circulated in the fluid passage in a manner shown in FIG. 17.

That is, the fluid blown off from the respective blowers 4 flows into the connection wall side passage 50 and the connection wall side passage 51. The fluid flowing into the respective connection wall side passages 50, 51 flows smoothly from a lower side (bottom wall 25 side) to an upper side (top wall 24 side) along the fin parts, which are arranged in an inclined manner, of the first inside fins 151. Each of the respective connection wall side passages 50, 51 is a passage elongated along the long side of each of the connection wall side passages 50, 51 and having a flat cross section. An inlet cross sectional area when the fluid flows into each of the connection wall side passages 50, 51 is smaller than an inlet cross sectional area when the fluid flows into the other passage such as the top wall side passage 52, the stack passage 54, and the bottom wall side passage 53, so that a certain level of flow rate of the fluid can be developed and each of the connection wall side passages 50, 51 provides a field in which a dynamic pressure is mainly applied. Hence, the heat of the fluid generated by the flow rate is effectively transmitted to the first inside fins 151 in each of the connection wall side passages 50, 51 and is further emitted to the outside via the connection wall parts 22, 23.

Next, the fluid flows smoothly in the fin parts of the second inside fins 152 continuously connected to the first inside fins 151 and flows into the top wall side passage 52 along the fin parts. An inlet cross sectional area when the fluid flows into the top wall side passage 52 is distinctly larger than the inlet cross sectional area when the fluid flows into each of the connection wall side passages 50, 51, so that a flow rate of the fluid is made smaller and the top wall side passage 52 provides a field in which a static pressure is mainly applied. Hence, the fluid flowing into the top wall side passage 52 from the respective connection wall side passages 50, 51 is uniformly spread in the top wall side passage 52.

As shown in FIG. 17, the fluid flowing into the top wall side passage 52 from the connection wall side passage 50 is mainly spread in the region of two battery stacks 3 on the connection side part 22 side. Further, the fluid flowing into the top wall side passage 52 from the connection wall side passage 51 is mainly spread in the region of two battery stacks 3 on the connection side part 23 side. The heat of the fluid flowing into the top wall side passage 52 is transmitted to the top wall 24 from the second inside fins 152 or is transmitted directly to the top wall 24 and then is emitted to the outside.

Next, the fluid flowing into the top wall side passage 52 flows in the stack passages 54 formed between the respective battery cells 7 and reaches the bottom wall side passage 53. Here, the respective connection wall side passages 50, 51 and the top wall side passage 52 are brought into a positive pressure space by air being blown out by the respective blowers 4. Further, the bottom wall side passage 53 is brought into a negative pressure space by air being sucked up by the respective blowers 4. Hence, the fluid results in being continuously moved from the top wall side passage 52 side to the bottom wall side passage 53 side by a pressure difference between the positive pressure space and the negative pressure space. When the fluid flows in the stack passages 54, the heat of the respective battery cells 7 is transmitted to the fluid.

Next, the fluid flowing into the bottom wall side passage 53 moves along the longitudinal direction of respective beams 118 and reaches the suction ports of the respective blowers 4. Then, the heat of the fluid flowing into the bottom wall side passage 53 is transmitted to the bottom wall 25 and is emitted to the outside.

In this regard, the fluid passage 5 is formed in such a way that the whole amount of fluid blown cut from the blowers 4 flows in the respective connection wall side passages 50, 51, the top wall side passage 52, the stack passages 54, and the bottom wall side passage 53 in this order. In other words, the fluid passage 5 is formed in such a way that the fluid does not bypass these passages.

As described above, the fluid is circulated in the fluid passage 5 in the case 2, so that the heat of the fluid, that is, the heat of the battery cells 7 is emitted to the outside mainly from the top wall 24 and the bottom wall 25 each having a large area. At this time, the heat exchange is accelerated by the respective inside fins 151, 152. Hence, the respective battery cells 7 have their temperatures controlled to a suitable temperature.

Further, as described above, in the high heat radiation mode, not only the respective blowers 4 are activated but also the outside blower 172 in the outside duct 170 is activated. In this case, the air-conditioned air in a vehicle compartment is sucked into the outside duct 170 from a suction part of the outside duct 170.

Figure 18:
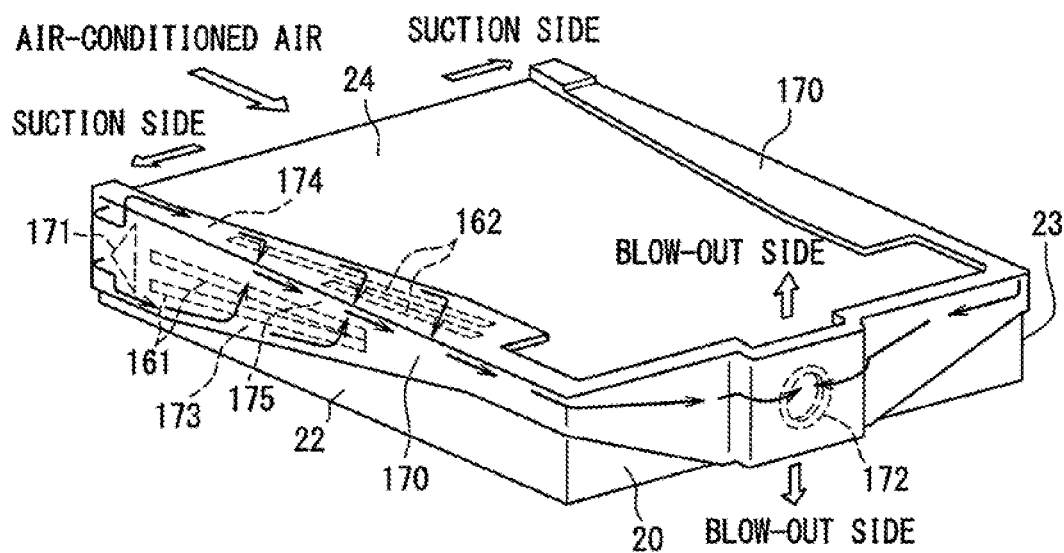
FIG. 18 is a perspective view to illustrate a flow of fluid by the outside fins in the third embodiment.

The air-conditioned air sucked from the suction part, as shown in FIG. 18, is branched by the air branching unit 171, thereby being branched to the lower side of the first outside fins 161 and to a center side of the case 2 of the second outside fins 162. The respective air flows pass the corrugated passages 160*b* in such a way as to cross the respective outside fins 161, 162 and are joined in a joining passage part 175 and then are blown out from the blowout parts formed in the upper part and the lower part of the outside blower 172.

At this time, the heat of the fluid in the case 2 is transmitted to the air-conditioned air via the respective inside fins 151, 152, the connection wall parts 22, 23, the top wall 24, and the respective outside fins 161, 162 and then is emitted to the outside. Hence, the exchange of the heat of the fluid in the case 2 is further accelerated by the respective outside fins 161, 162 as well as the respective inside fins 151, 152. Hence, the respective battery cells 7 are forcedly cooled to a suitable temperature in a short time.

The flow of the air-conditioned air along the outside fins 160 will be described in more detail. The fluid branched to the lower side by the air branching unit 171 flows into a connection wall outside passage 173 surrounded by the outside duct 170 and the connection wall part 22 and then passes through the two first outside fins 161 in series. The fluid branched to the upper side by the air branching unit 171 flows into a top wall outside passage 174 surrounded by the outside duct 170 and the top wall 24 and then passes through the two second outside fins 162 in series.

The fluid flowing out from the connection wall outside passage 173 and the fluid flowing out from the top wall side outside passage 174 flow into the joining passage part 175 surrounded by the outside duct 170 and the connection wall part 22, thereby being joined. In other words, both of the fluids pass in parallel in the first outside fins 161 and in the second outside fins 162. The joining passage part 175 is formed in a shape extended horizontally along the longitudinal direction of the connection wall parts 22, 23. In other words, of the two first outside fins 161, the first outside fins 161 positioned on the downstream side are arranged in such a way that a corrugated direction La is extended horizontally along the longitudinal direction of the connection wall parts 22, 23.

Figure 10:
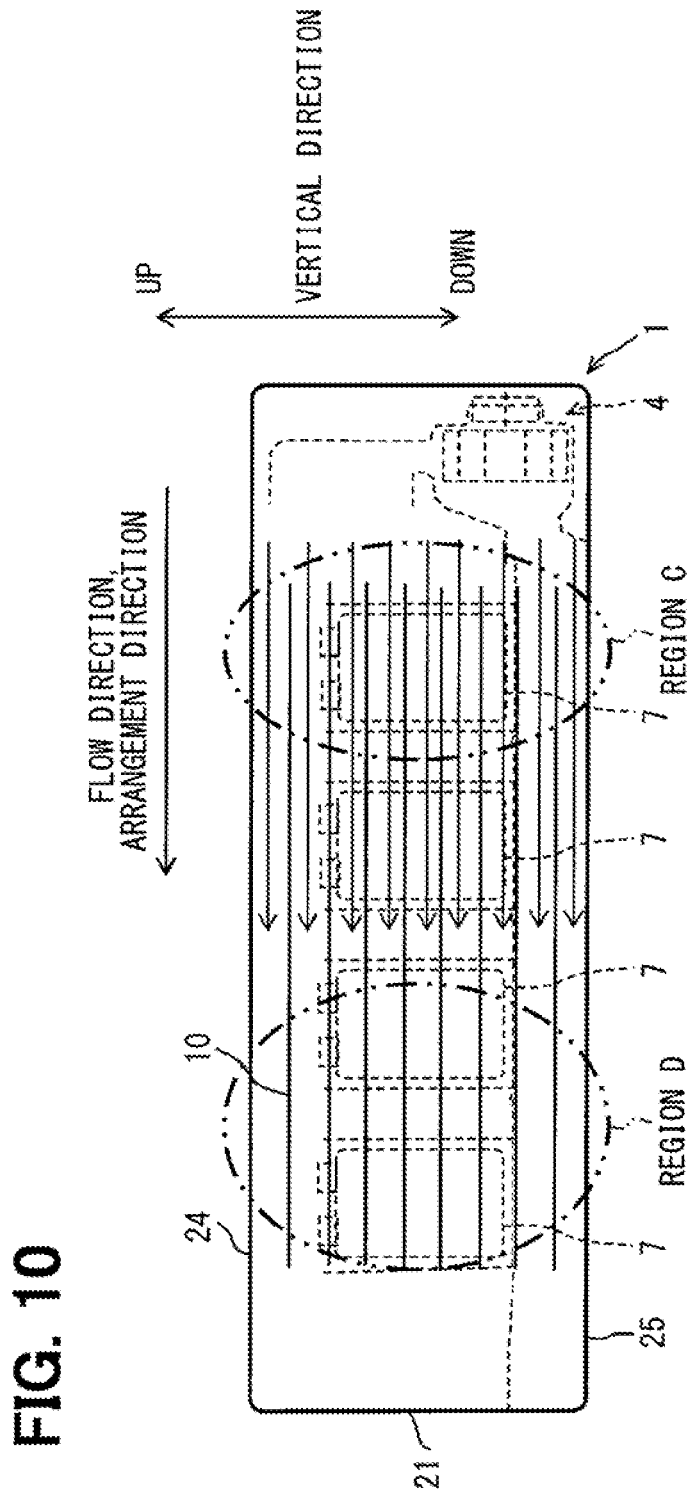
FIG. 10 is a general diagram, when viewed from a connection wall part side, to illustrate a mode in which heat radiation fins are formed in a comparative example.

As described above, according to the present embodiment, each of the blowout ports 46a is formed in the shape extended in the passage width direction of each of the connection wall parts 22, 23 and is arranged in such a way that the fluid is blown out in the longitudinal direction of each of the connection wall parts 22, 23 (specified direction). For this reason, in a part positioned on the upstream side with respect to the first fins 221 of each of the connection wall side passages 50, 51, the fluid flows in the specified direction all over the passage width direction (see FIG. 1. Then, the fluid flowing in this manner flows in a manner inclined to the inflow plane of the first fins 221. Then, the first fins 221 are arranged in such a way that the fluid flowing between the first fins 221 is inclined to the blowout direction D1 (specified direction). For this reason, even if a fin pitch of the first fins 221 is made equal to a fin pitch relating to the comparative example (FIG. 10), a larger number of first fins 221 than the comparative example can be formed.

Here, in an upstream part of the first fins 221, a temperature difference between the fluid and the outside air is large and hence a heat radiation amount per unit area is large and the heat radiation efficiency is high. In contrast, in a downstream part of the first fins 221, the heat radiation efficiency is lower than the upstream part. In view of this point, in the present embodiment, the number of fins can be increased as described above and hence a part having a high heat radiation efficiency can be increased and the heat radiation efficiency can be improved.

Further, in the present embodiment, there are provided outside fins 160, the outside duct 170, and the outside blower 172, so the exchange of the heat of the fluid in the case 2 is further accelerated by the respective outside fins 161, 162 as well as the respective inside fins 151, 152. Hence, it is possible to accelerate the cooling of the respective battery cells 7 to a suitable temperature in a short time.

Still further, according to the present embodiment, the whole of the inside fin range A1 of the case 2 is included in the outside duct range A2. For this reason, the heat transmitted to the case 2 through the first inside fins 151 is easily transmitted to the first outside fins 161. Then, the heat transmitted to the first outside fins 161 is exchanged with air (air-conditioned air) circulated in the outside duct 170 by the outside blower 172, thereby being radiated. Hence, a heat radiation amount per unit area can be increased and hence the cooling of the battery cells 7 can be accelerated. Such an effect of increasing the heat radiation amount can be remarkably produced, in particular, when the outside blower 172 is activated in the high radiation mode.

Fourth Embodiment

Figure 19:
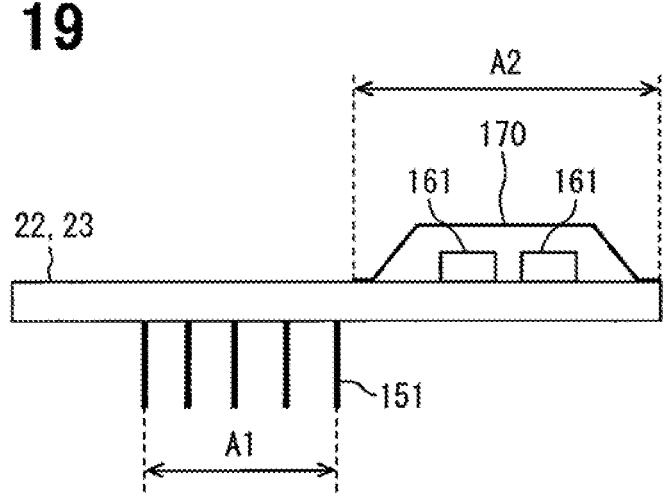
FIG. 19 is a section view to schematically illustrate a position relationship between an inside fin range and an outside duct range in a fourth embodiment.
Figure 20:
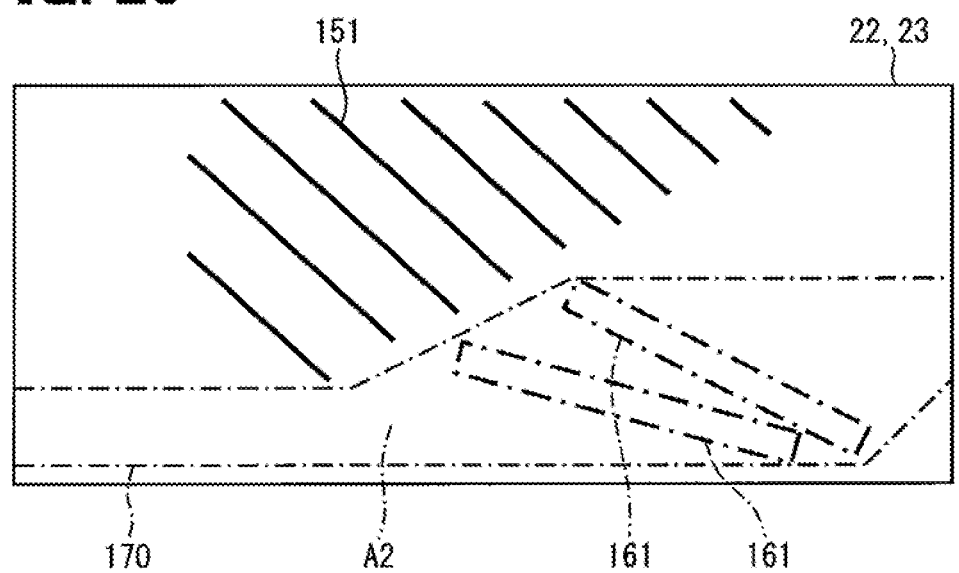
FIG. 20 is a front view to schematically illustrate the position relationship between the inside fin range and the outside duct range in the fourth embodiment.

In the third embodiment described above, the whole of the inside fin range A1 is included in the outside duct range A2. In contrast to this, in the present embodiment, as shown in FIG. 19 and FIG. 20, the whole of the inside fin range A1 is positioned outside the outside duct range A2. Further, of the top wall 24, the whole of a range in which the second inside fins 152 are arranged is positioned outside a range covered with the outside duct 170 of the top wall 24. In other words, of the case 2, the whole of the range in which the inside fins are arranged is positioned outside the outside duct 170.

Further, when the first outside fins 161 are viewed from a direction vertical to the wall surfaces of the connection wall parts 22, 23, the first outside fins 161 are arranged at a position separate from the first inside fins 151. Specifically, the whole of the first outside fins 161 are arranged at a position separate from the first inside fins 151. When the second outside fins 162 are viewed from a direction vertical to the wall surface of the top wall 24, the second outside fins 162 are arranged at a position separate from the second inside fins 152. Specifically, the whole of the second outside fins 162 are arranged at a position separate from the second inside fins 152.

As described above, in the high heat radiation mode, not only the respective blowers 4 are activated but also the outside blower 172 is activated. In contrast to this, in the low heat radiation mode, the respective blowers 4 are activated but the outside blower 172 is stopped.

The outside blower 172 is arranged outside the case 2, and the suction port and the blowout port of the outside blower 172 are opened to the outside of the case 2. Hence, as compared with the blowers 4 arranged inside the case 2, noises of the outside blower 172 are easily heard by a user. In view of this point, in a case where the temperature of the battery cells 7 is lower than a specified temperature, it is desirable in terms of decreasing noises to stop the outside blower 172 as described above. However, under the circumstances where the outside blower 172 is stopped, the air does not flow in the outside duct 170 and hence the air of high temperature stays in the outside duct 170, so that the outside duct 170 interferes with the heat radiation from the case 2.

In view of this point, in the present embodiment, the whole of the inside fin range A1 is positioned outside the outside duct range A2. For this reason, it is possible to inhibit the outside duct 170 from interfering with the heat radiation from the case 2 under the circumstances where the outside blower 172 is stopped. Hence, when the outside blower 172 is stopped, a heat radiation amount from the case 2 can be increased.

Fifth Embodiment

Figure 21:
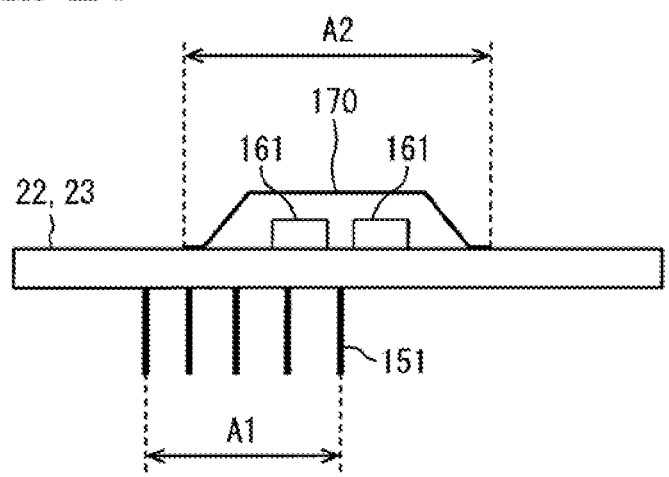
FIG. 21 is a section view to schematically illustrate a position relationship between an inside fin range and an outside duct range in a fifth embodiment.
Figure 22:
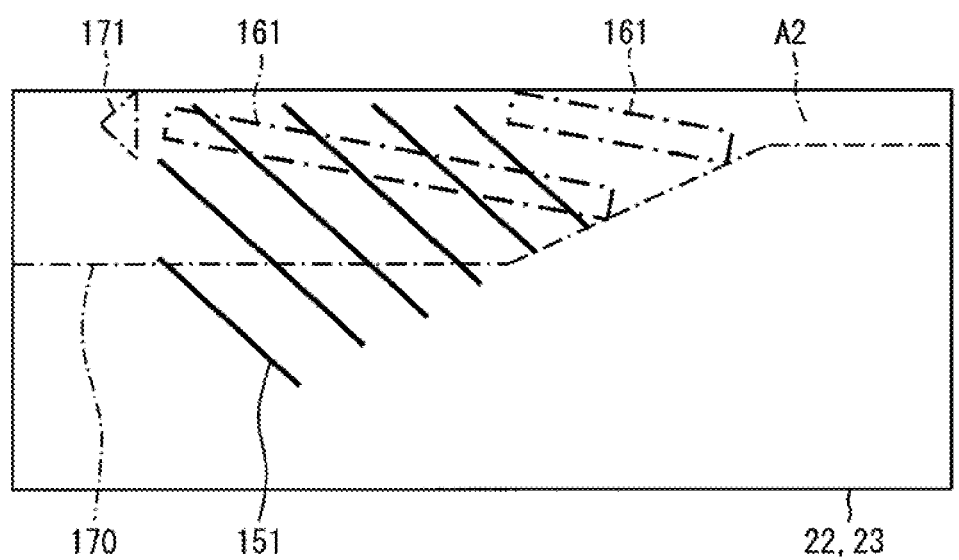
FIG. 22 is a front view to schematically illustrate the position relationship between the inside fin range and the outside duct range in the fifth embodiment.

In the third embodiment described above, the whole of the inside fin range A1 is included in the outside duct range A2. In contrast to this, in the present embodiment, as shown in FIG. 21 and FIG. 22, the inside fin range A1 is partially included in the outside duct range A2. Further, a range in which the second inside fins 152 are arranged of the top wall 24 is partially included in a range covered with the outside duct 170 of the top wall 24. In other words, a range in which the inside fins 150 are arranged of the case 2 is partially included in a range of the outside duct 170.

Further, when the first outside fins 161 are viewed from a direction vertical to the wall surfaces of the connection wall parts 22, 23, the first outside fins 161 are arranged at a position in which the first outside fins 161 partially overlap the first inside fins 151. Specifically, the first outside fins 161 are arranged at a position in which the first outside fins 161 partially overlap the first inside fins 151. When the second outside fins 162 are viewed from a direction vertical to the top wall 24, the second outside fins 162 are arranged at a position in which the second outside fins 162 partially overlap the second inside fins 152.

As described above, according to the present embodiment, the inside fin range A1 is partially included in the outside fin range A2. For this reason, under the circumstances where the outside blower 172 is stopped, as compared with a case where the whole of the inside fin range A1 is positioned in the outside duct range AZ it is possible to inhibit the outside duct 170 from interfering with the heat radiation from the case 2. Nevertheless, under the circumstances where the outside blower 172 is activated, as compared with a case where the whole of the inside fin range A1 is positioned outside the outside duct range A2, the heat transmitted to the case 2 through the first inside fins 151 is easily transmitted to the first outside fins 161. Hence, the heat radiation amount from the case 2 can be increased.

In this regard, the present disclosure is not limited to the embodiments described above but the embodiments described above may be modified in the following manners as far as the modified embodiments are within a technical scope of the present disclosure.

(1) In the first embodiment described above, the first region 501 is formed in the connection wall side passage 50, but it is essential only that the first region 501 is formed at least in one of the fluid passage 5.

(2) in the first embodiment described above, the fluid flows in the first region 501 to the top wall side end part 222 nearly in parallel to the inflow direction, but the fluid passage may have a place in which the fluid passage is curved and not in parallel to the inflow direction in the middle.

Figure 8:
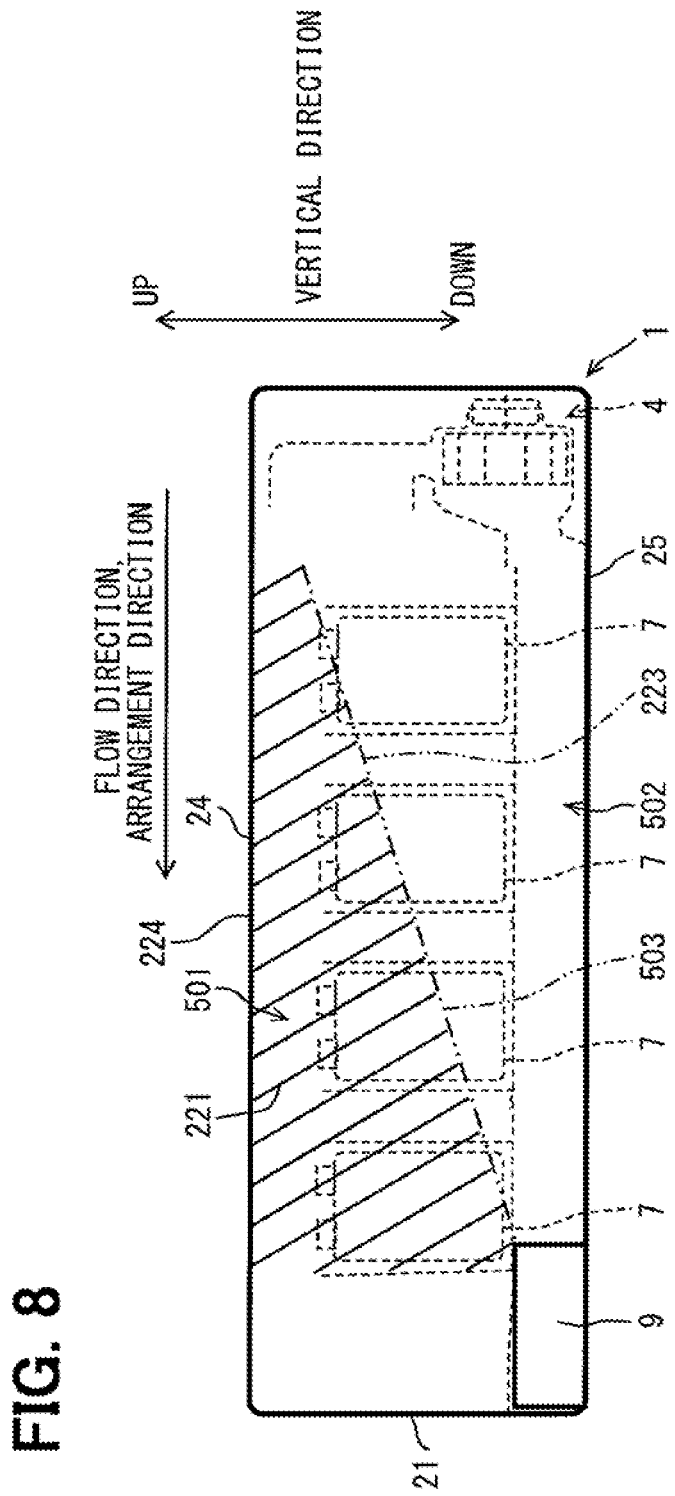
FIG. 8 is an illustration of a modified example of the first embodiment.

(3) In the first embodiment described above, at the downstream end 50A of the connection wall side passage 50, the width in the vertical direction of the first region 501 is equal to the width of the vertical direction of the connection wall side passage 50. However, as shown in FIG. 8, at the downstream end 50A of the connection wall side passage 50, the width in the vertical direction of the first region 501 may be smaller than the width of the vertical direction of the connection wall side passage 50. In this case, a cramming member 9 is arranged between an end part of the anti-blower side wall part 21 side of the first region 501 and the bottom wall 25. The cramming member 9 is used for inhibiting the fluid from flowing between the end part of the anti-blower side wall part 21 side of the first region 501 and the bottom wall 25 and may be made of any material.

Figure 9:
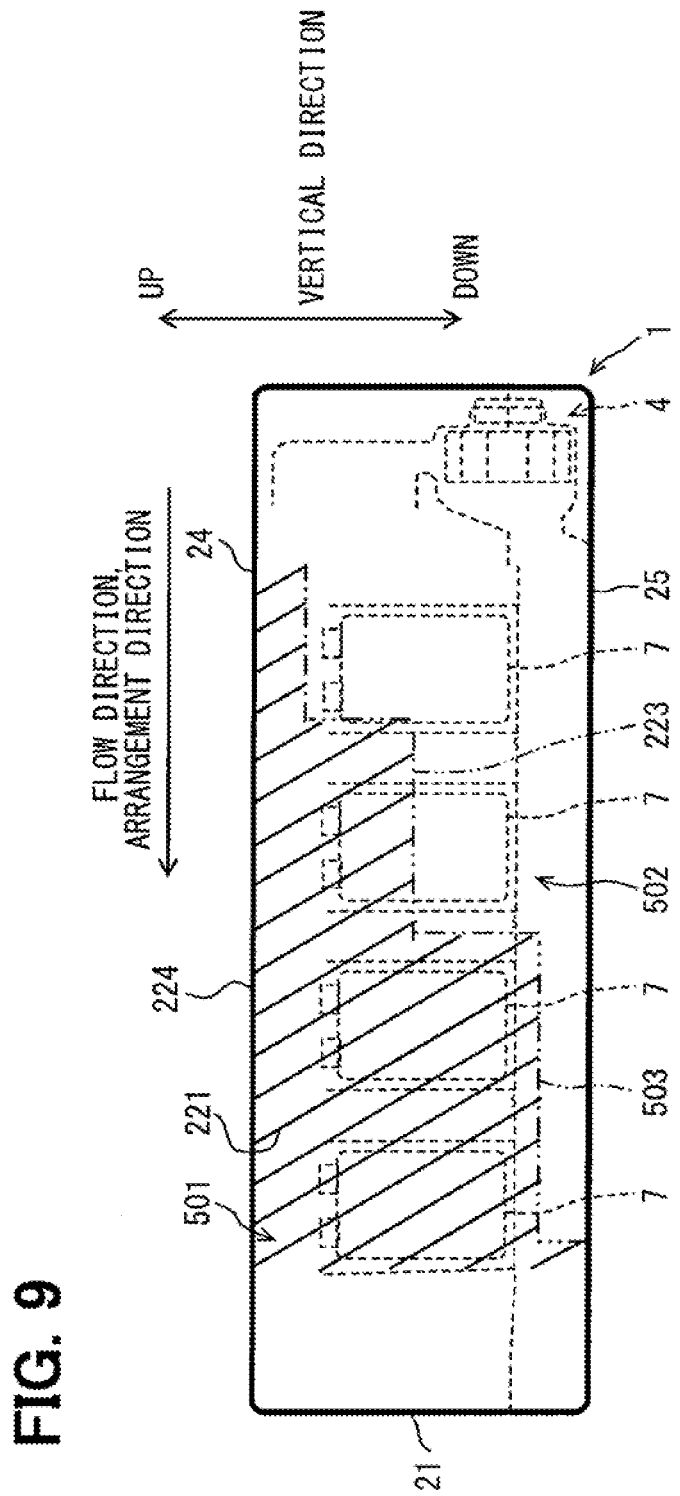
FIG. 9 is an illustration of a modified example of the embodiments.

(4) In the first embodiment described above, when each of the first region 501 and the third region 521 is viewed from the specified direction, each of the first region 501 and the second region 521 is formed nearly in the shape of a triangle but, as shown in FIG. 9, may be formed stepwise.

(5) In the first embodiment described above, the example in which the fins 221, 241 are the plate fins has been shown. However, the fins 221, 241 may be other kind of fins such as louver fins if the fluid can pass between the fins nearly in parallel to the inflow direction in which the fluid flows into the inflow port 223.

(6) In the second embodiment described above, the shape of the first region 501 when the first region 501 is viewed from the stacking direction is different from the nearly triangular shape in the first embodiment but may be the same shape as the first embodiment.

(7) In the second embodiment described above, the third region 521 is formed continuously to the first region 501, but may be formed close to the first region 501. In this case, the fourth region 522 is partially arranged between the third region 521 and the first region 501.

(8) In the second embodiment described above, the inclined angles α, β, γ are the same angles but may be different from each other.

(9) The outside fins 160 according to the third embodiment described above are corrugated fins having louvers 160a formed therein but may be corrugated fins having slits formed therein in place of the louver 160a or may be corrugated fins having the louver 160a not formed therein. Further, the outside fins 160 may be straight fins like the inside fins 151, 152.

(10) The first fins 221 and the inside fins 150 are not limited to the straight fins but may be, for example, pin-shaped fins or corrugated fins.

(11) As a fan built in the blower 4 arranged in the case 2 can be employed not only the sirocco fan described in the first embodiment but also an axial fan or a turbofan.

(12) The fins 221, 241, the inside fins 150, and the outside fins 160 in the respective embodiments described above may be made by fixing separate parts to the wall of the case 2 or may be made by forming partial portions of the wall of the case 2 in the shape of a fin.

(13) In the respective embodiments described above, the case 2 is formed in a hexahedron or a rectangular parallelepiped, but the housing included in the disclosure is not limited to this shape. For example, the case 2 may be a polyhedron having more than 6 faces or at least one face of the case 2 may be a face including a curved face. Further, in the case 2, the top wall may be formed in the shape of a dome including a curved face or a longitudinal cross section of the housing may be formed in a trapezoidal shape. Further, in the case 2, the top wall is a wall positioned opposite to the bottom wall, and the shape of the top wall may include a shape of a flat face or a curved face. Further, in the case 2, the side wall may be a wall extended in a direction to cross the bottom wall from the bottom wall or may be a wall extended in a direction to cross the top wall from the top wall. A boundary part between the top wall and the side wall in the case 2 may form a corner or a curved face. A boundary part between the bottom wall and the side wall in the case 2 may form a corner or a curved face.

(14) In the respective embodiments described above, the number of battery stacks 3 included in the battery pack is four but is not limited to four. That is, the battery stack 3 included in the battery pack includes: a case where only one battery stack 3 is housed in the housing; a case where a plurality of battery stacks 3 are arranged in one direction in the housing; and a case where a plurality of battery stacks 3 are arranged in one direction and where a plurality of battery stacks 3 are arranged also in other direction to cross the one direction.

(15) In the respective embodiments described above, the battery stacks 3 are arranged in the case 2 with the electrode terminal 71 directed opposite to the top wall 24. In contrast to this, the battery stacks 3 may be arranged in the case 2 with the electrode terminal 71 directed opposite to the blower side wall part 20, the anti-blower side wall part 21, or the connection wall parts 22, 23.

To sum up, the battery pack 1 of the above embodiments may be described as follows.

A battery pack 1 includes a plurality of batteries 7, a housing 2, a fluid circulation part 4, a first fluid passage 50, and a first fin 221, 151. The housing 2 accommodates the plurality of batteries 7. The fluid circulation part 4 is accommodated in the housing 2 to circulate fluid for cooling the plurality of batteries 7 in the housing 2. Fluid flows through the first fluid passage 50. The first fluid passage 50 is provided between the plurality of batteries 7 and a first inside wall surface 22 serving as an inside wall surface of the housing 2. The first fin 221, 151 is formed on the first inside wall surface 22 to protrude therefrom. The first fin 221, 151 exchanges heat between fluid and the first inside wall surface 22. The first fluid passage 50 is divided between a first region 501 that is a space where the first fin 221, 151 is arranged, and a second region 502 that is a space where the first fin 221, 151 is not arranged. Fluid flows from the second region 502 into the first region 501. The first fin 221, 151 includes an inflow port 223 through which fluid flows into the first region 501, and an outflow port 224 through which fluid flows out of the first region 501. The first fin 221, 151 is formed to extend from the inflow port 223 to the outflow port 224. An area of the inflow port 223 is larger than a cross-sectional area of the first fluid passage 50 when viewed in a flow direction of fluid.

According to the battery pack of the first aspect, an area of the inflow port is larger than a cross sectional area of the first fluid passage when viewed from the flow direction of the fluid. In other words, as compared with the comparative example, the present embodiment is larger in the area of the inflow port through which the fluid flows into the first region. For this reason, in the present aspect, a larger number of fins than the comparative example can be formed and hence the fluid, which is supplied from a fluid drive part and has a higher temperature, can be made to flow into all fins. Hence, in the present aspect, the fluid having a sufficient temperature difference with respect to the outside air can be made to flow into all fins, so in a case where the heat radiation area nearly equal to the comparative example can be secured by increasing the number of fins, the heat radiation efficiency can be improved as compared with the comparative example.

A battery pack 1 includes a plurality of batteries 7, a housing 2, a blower 4, a fluid passage 50, 51, a plurality of fins 221, 151, and an air duct 46. The housing 2 accommodates the plurality of batteries 7. The blower 4 circulates fluid for cooling the plurality of batteries 7 in the housing 2. The fluid passage 50, 51 is formed between an inside wall surface 22 of the housing 2 and the plurality of batteries 7 and extends in a predetermined direction along the inside wall surface 22. The plurality of fins 221, 151 protrude from the inside wall surface 22 into the fluid passage 50, 51. The air duct 46 is connected to the blower 4 and includes an blowout port 46a. The fluid which has been blown out from the blower 4 is blown out to the fluid passage 50, 51 through the blowout port 46a. The blowout port 46a has a shape extending along the inside wall surface 22 in a direction that crosses the predetermined direction, and is arranged in a direction to blow out the fluid in the predetermined direction. The fluid flowing out from the blowout port 46a flows in obliquely relative to an inflow plane 503 formed by upstream end parts of the plurality of fins 221, 151.

According to the battery pack of the second aspect, the blowout port is formed in a shape extending along the inside wall surface in a direction to cross the specified direction (passage width direction) and is arranged in a direction to blow out the fluid in the specified direction. For this reason, of the fluid passage, at a part positioned on the upstream side to the fins, the fluid flows in the specified direction all over the passage width direction. The fluid flowing in this way flows into in a manner inclined to the inflow plane of the fins. For this reason, if the fins are formed in a direction in which the fluid flowing between the fins is inclined to the specified direction, a larger number of fins than the comparative example (see FIG. 10) can be formed with a fin pitch set equal to a fin pitch according to the comparative example.

Here, in the upstream part of the fins, a temperature difference between the fluid and the outside air is large and hence a heat radiation amount per unit area is large and the heat radiation efficiency is high. On other hand, in the downstream part of the fins, the heat radiation efficiency is lower than in the upstream part. In view of this point, in the second aspect described above, the number of fins can be increased as described above and hence a part in which the heat radiation efficiency is high can be increased. Hence, in a case where the total area of the plurality of fins is equal to that of the comparative example, the heat radiation amount can be increased as compared with the comparative example. In other words, the heat radiation efficiency can be improved by increasing the number of fins.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A battery pack comprising:
   a plurality of batteries;
   a housing that accommodates the plurality of batteries;
   a fluid circulation part that is accommodated in the housing to circulate fluid for cooling the plurality of batteries in the housing;
   a first fluid passage through which fluid flows, the first fluid passage being located between the plurality of batteries and a first inside wall surface of the housing;
   a second fluid passage formed between a second inside wall surface of the housing, which is another inside wall surface different from the first inside wall surface, and the plurality of batteries; and
   a plurality of first fins formed on the first inside wall surface, the plurality of first fins protruding from the first inside wall surface, wherein:
   the plurality of first fins exchange heat between the fluid and the first inside wall surface;
   the first fluid passage is divided between a first region that is a space where the plurality of first fins are arranged, and a second region that is a space where the plurality of first fins are not arranged;
   the fluid flows from the second region into the first region;
   the fluid flows from the first fluid passage continuously into the second fluid passage;
   the second fluid passage includes a third region, in which a second fin is protrusively formed to exchange heat between fluid and the second inside wall surface;
   the third region is formed such that fluid flows from the first region continuously into the third region;
   an inflow port is formed between each adjacent two first fins of the plurality of first fins, and the fluid flows into the first region;
   an outflow port is formed between each adjacent two of the plurality of first fins, and the fluid flows out of the first region through the outflow port;
   the plurality of first fins extend from the inflow port to the outflow port;
   a total of an entire area of each inflow port is larger than an entire cross-sectional area of the second region of the first fluid passage when viewed in a flow direction of fluid, so that an entire cross-sectional area through which the fluid passes the first region is larger than an entire cross-sectional area of the second region; and
   a length of a path for fluid from the inflow port through which fluid flows into the first region to an outflow port through which fluid flows out of the third region is the same irrespective of a position of the inflow port of the first region.

2. The battery pack according to claim 1, wherein:
the first fluid passage has a first side in the flow direction of fluid, and a second side in a direction perpendicular both to the flow direction of fluid and to a vertical direction of the first inside wall surface, the first side being longer than the second side; and
the plurality of first fins are formed such that fluid flows in the first region in parallel with a direction in which fluid flows into the first region.

3. The battery pack according to claim 1, wherein a width of the first region in a direction perpendicular both to the flow direction of fluid and to a vertical direction of the first inside wall surface is equal to a width of the first fluid passage in the direction perpendicular both to the flow direction of fluid and to the vertical direction of the first inside wall surface on a downstream side in the flow direction of fluid.

4. The battery pack according to claim 1, wherein a distance between the plurality of batteries and the plurality of first fins is smaller than a protruding length of each of the plurality of first fins.

5. The battery pack according to claim 1, wherein a distance between the plurality of batteries and the second fin is smaller than a protruding length of the second fin.

6. A battery pack comprising:
a plurality of batteries;
a housing that accommodates the plurality of batteries;
a fluid circulation part that is accommodated in the housing to circulate fluid for cooling the plurality of batteries in the housing;
a first fluid passage through which fluid flows, the first fluid passage being located between the plurality of batteries and a first inside wall surface of the housing;
a plurality of first fins formed on the first inside wall surface, the plurality of first fins protruding from the first inside wall surface;
an outside duct that is attached to an outside surface of the housing;
an outside blower that blows air through the outside duct; and
an outside fin that is located in the outside duct and protrudes from the outside surface of the housing, wherein:
an inside fin range is a region of the housing in which the plurality of first fins are formed;
an outside duct range is a region of the housing which is covered with the outside duct;
an entire part of the inside fin range is included in the outside duct range;
the plurality of first fins exchange heat between the fluid and the first inside wall surface;
the first fluid passage is divided between a first region that is a space where the plurality of first fins are arranged, and a second region that is a space where the plurality of first fins are not arranged;
the fluid flows from the second region into the first region;
an inflow port is formed between each adjacent two first fins of the plurality of first fins, and the fluid flows into the first region;
an outflow port is formed between each adjacent two of the plurality of first fins, and the fluid flows out of the first region through the outflow port;
the plurality of first fins extend from the inflow port to the outflow port; and
a total of an entire area of each inflow port is larger than an entire cross-sectional area of the second region of the first fluid passage when viewed in a flow direction of fluid, so that an entire cross-sectional area through which the fluid passes the first region is larger than an entire cross-sectional area of the second region.

7. A battery pack comprising:
a plurality of batteries;
a housing that accommodates the plurality of batteries;
a fluid circulation part that is accommodated in the housing to circulate fluid for cooling the plurality of batteries in the housing;
a first fluid passage through which fluid flows, the first fluid passage being located between the plurality of batteries and a first inside wall surface of the housing;
a plurality of first fins formed on the first inside wall surface, the plurality of first fins protruding from the first inside wall surface;
an outside duct that is attached to an outside surface of the housing;
an outside blower that blows air through the outside duct; and
an outside fin that is located in the outside duct and protrudes from the outside surface of the housing, wherein:
an inside fin range is a region of the housing in which the plurality of first fins are formed;
an outside duct range is a region of the housing which is covered with the outside duct;
the inside fin range is included partly in the outside duct range;
the plurality of first fins exchange heat between the fluid and the first inside wall surface;
the first fluid passage is divided between a first region that is a space where the plurality of first fins are arranged, and a second region that is a space where the plurality of first fins are not arranged;
the fluid flows from the second region into the first region;
an inflow port is formed between each adjacent two first fins of the plurality of first fins, and the fluid flows into the first region;
an outflow port is formed between each adjacent two of the plurality of first fins, and the fluid flows out of the first region through the outflow port;
the plurality of first fins extend from the inflow port to the outflow port; and
a total of an entire area of each inflow port is larger than an entire cross-sectional area of the second region of the first fluid passage when viewed in a flow direction of fluid, so that an entire cross-sectional area through which the fluid passes the first region is larger than an entire cross-sectional area of the second region.

8. A battery pack comprising:
a plurality of batteries;
a housing that accommodates the plurality of batteries;
a fluid circulation part that is accommodated in the housing to circulate fluid for cooling the plurality of batteries in the housing;
a first fluid passage through which fluid flows, the first fluid passage being located between the plurality of batteries and a first inside wall surface of the housing;

a plurality of first fins formed on the first inside wall surface, the plurality of first fins protruding from the first inside wall surface;

an outside duct that is attached to an outside surface of the housing;

an outside blower that blows air through the outside duct; and an outside fin that is located in the outside duct and protrudes from the outside surface of the housing, wherein:

an inside fin range is a region of the housing in which the plurality of first fins are formed;

an outside duct range is a region of the housing which is covered with the outside duct;

an entire part of the inside fin range is located outside of the outside duct range;

the plurality of first fins exchange heat between the fluid and the first inside wall surface;

the first fluid passage is divided between a first region that is a space where the plurality of first fins are arranged, and a second region that is a space where the plurality of first fins are not arranged;

the fluid flows from the second region into the first region;

an inflow port is formed between each adjacent two first fins of the plurality of first fins, and the fluid flows into the first region;

an outflow port is formed between each adjacent two of the plurality of first fins, and the fluid flows out of the first region through the outflow port;

the plurality of first fins extend from the inflow port to the outflow port; and a total of an entire area of each inflow port is larger than an entire cross-sectional area of the second region of the first fluid passage when viewed in a flow direction of fluid, so that an entire cross-sectional area through which the fluid passes the first region is larger than an entire cross-sectional area of the second region.

9. A battery pack comprising:

a plurality of batteries;

a housing that accommodates the plurality of batteries;

a blower that circulates fluid for cooling the plurality of batteries in the housing;

a first fluid passage that is formed between a first inside wall surface of the housing and the plurality of batteries, the first fluid passage extending in a predetermined direction along the first inside wall surface;

a second fluid passage formed between a second inside wall surface of the housing, which is another inside wall surface different from the first inside wall surface, and the plurality of batteries; and a plurality of fins that protrude from the first inside wall surface into the first fluid passage; and an air duct that is connected to the blower and includes an blowout port, wherein:

the fluid which has been blown out from the blower is blown out to the first fluid passage through the blowout port;

the blowout port has a shape extending along the first inside wall surface in a direction that crosses the predetermined direction, and is arranged in a direction to blow out the fluid in the predetermined direction;

the fluid flowing out from the blowout port flows obliquely relative to an inflow plane formed by upstream end parts of the plurality of fins;

the fluid flows from the first fluid passage continuously into the second fluid passage;

the second fluid passage includes a third region, in which a second fin is protrusively formed to exchange heat between fluid and the second inside wall surface;

the third region is formed such that fluid flows from the first region continuously into the third region; and a length of a path for fluid to an inflow port through which fluid flows into the first region to the blowout port through which fluid flows out of the third region is the same irrespective of a position of the inflow port of the first region.

10. The battery pack according to claim 1, wherein a ratio of a height of the second region to the cross-sectional area of the second region changes linearly as the height of the second region changes.

* * * * *